US007047209B2

(12) United States Patent
Filepp et al.

(10) Patent No.: US 7,047,209 B2
(45) Date of Patent: May 16, 2006

(54) METHOD FOR PRESENTING ADVERTISING IN AN INTERACTIVE SERVICE

(75) Inventors: Robert Filepp, Springfield, NJ (US); Alexander W. Bidwell, New York, NY (US); Francis C. Young, Pearl River, NY (US); Allan M. Wolf, Ridgefield, CT (US); Duane Tiemann, Ossining, NY (US); Mel Bellar, New York, NY (US); Robert D. Cohen, New Fairfield, CT (US); James A. Galambos, Westport, CT (US); Kenneth H. Appleman, white Plains, NY (US); Sam Meo, New York, NY (US)

(73) Assignee: International Business Machines, Armonk, NY (US)

( * ) Notice: Subject to any disclaimer, the term of this patent is extended or adjusted under 35 U.S.C. 154(b) by 561 days.

(21) Appl. No.: 10/144,953

(22) Filed: May 15, 2002

(65) Prior Publication Data
US 2003/0018527 A1    Jan. 23, 2003

Related U.S. Application Data

(60) Continuation of application No. 08/158,025, filed on Nov. 26, 1993, which is a division of application No. 07/388,156, filed on Jul. 28, 1989, now Pat. No. 5,347,632, which is a continuation-in-part of application No. 07/328,790, filed on Mar. 23, 1989, now abandoned, which is a continuation-in-part of application No. 07/219,931, filed on Jul. 15, 1988, now abandoned.

(51) Int. Cl.
G06Q 30/00        (2006.01)
(52) U.S. Cl. ........................................ 705/14

(58) Field of Classification Search ............... None
See application file for complete search history.

(56) References Cited

U.S. PATENT DOCUMENTS 4,525,779 A * 6/1985 Davids et al. .............. 345/753

(Continued)

OTHER PUBLICATIONS

Alber, Antone F., *Videotex/Teletext*, Principles and Practices, *McGraw-Hill*, New York (1985).

(Continued)

*Primary Examiner*—Donald L. Champagne
(74) *Attorney, Agent, or Firm*—Connolly Bove Lodge & Hutz, LLP; Douglas Lefeve

(57) ABSTRACT

A method for presenting advertising in an interactive service provided on a computer network, the service featuring applications which include pre-created, interactive text/graphic sessions is described. The method features steps for presenting advertising concurrently with service applications at the user terminal configured as a reception system. In accordance with the method, the advertising is structured in a manner comparable to the service applications enabling the applications to be presented at a first portion of a display associated with the reception system and the advertising presented at a second portion. Further, steps are provided for storing and managing advertising at the user reception system so that advertising can be pre-fetched from the network and staged anticipation of being called for presentation. This minimizes the potential for communication line interference between application and advertising traffic and makes the advertising available reception system so as not to delay presentation of the service applications. Yet further the method features steps for individualizing the advertising supplied to enhance potential user interest by providing advertising based on a characterization of the user as defined by the users interaction with the service, demographics and geographical location. Yet additionally, advertising is provided with transactional facilities so that users can interact with it.

5 Claims, 16 Drawing Sheets

U.S. PATENT DOCUMENTS

| | | | |
|---|---|---|---|
| 4,552,349 | A | 11/1985 | Loos et al. |
| 4,575,579 | A | 3/1986 | Simon et al. |
| 4,688,167 | A | 8/1987 | Agarwal |
| 4,805,134 | A | 2/1989 | Calo et al. |
| 4,873,662 | A | 10/1989 | Sargent |

OTHER PUBLICATIONS

Horton, Cleveland, *IBM, Sears shooting for '88 entry; New life for videotext, Advertising Age* (from database), Apr. 6, 1987.

Forman, Ellen, *Surge seen for electronic shopping, Women's Daily Wear* (from database), May 21, 1987.

Ballinger, Jerrold, *Trintex Signs up 42 Advertising Clients; Is Hoping for Launch in Early '88, VP Says, DM News*(from database), Jun. 1, 1987.

Horton, Cleveland, *Big Advertisers link to videotext venture, Advertising Age*(from database), Jun. 15, 1987.

Markowitz, Arthur, *Trintex interactive videotext service will feature magazine-type format, Discount Store News* (from Database), Jun. 22, 1987.

*Trintex to Aim On-Line Ads at Demographic Segments, The American Banker* (from database), Jun. 30, 1987.

*Inside Trintex, Technology & Operations supplement, Women'Daily Wear* (from database), Sep. 8, 1987.

Kiley, David, *Trintex: Videotex Gets Personalized, ADWEEK* (from database), Oct. 12, 1987, Eastern Edition.

Mace, Scott, *Trintex System Offers Access to Variety of Consumer Services, InfoWorld* (from database), Nov. 30, 1987.

Gecsei, Jan, *The Architecture of Videotex Systems, Prentice-Hall* (1983) (from database), pp. 1-242.

Caplinger, Michael, "An Information System Based on Distributed Objects", OOPSLA '87 Proceedings.

Schatz, Bruce, "Telesophy: A System for Manipulating the Knowledge of a Community", 1987 IEEE.

Christodoulakis, S., "The Multimedia Object Presentation Manager of MINOS: A Symmetric Approach", ACM SIGMOD Conf. 1986.

Christodoulakis, S., "The Issues in the Architecture of a Document Archiver Using Optical Disk Technology", 1985 ACM.

Christodoulakis, S., "Multimedia Document Presentation, Information Extraction, and Document Formation in MINOS: A Model and A System" 1986 ACM.

Sigel, Efrem, "The Future of Videotext", 1983, Knowledge Industry Publications, Inc., White Plains NY and London.

\* cited by examiner

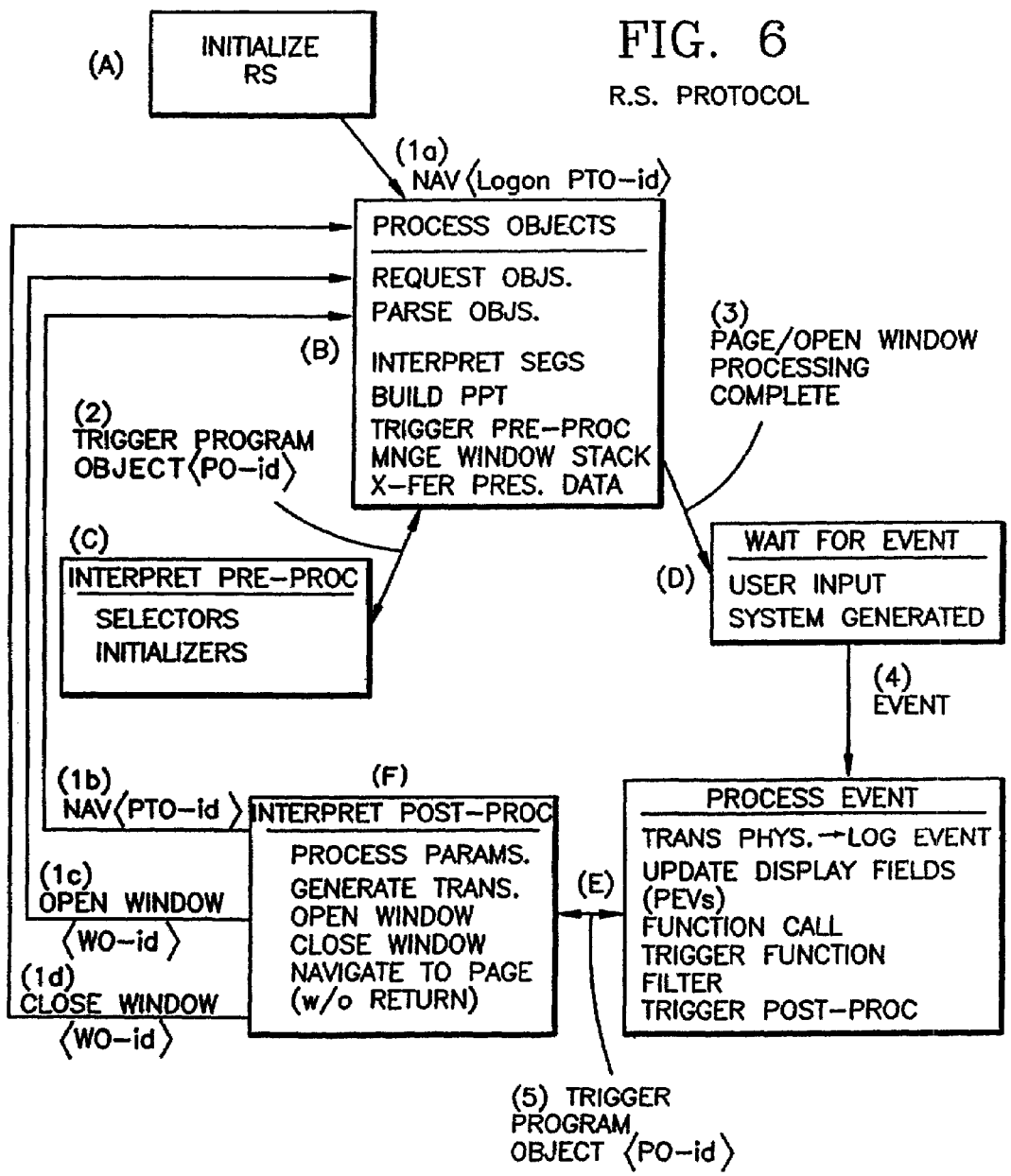

RECEPTION SYSTEM LAYERS

PAGE PROCESSING TABLE (ppt)

METHOD FOR PRESENTING ADVERTISING IN AN INTERACTIVE SERVICE

RELATED APPLICATIONS

This is a continuation application of Ser. No. 08/158,025, filed Nov. 26, 1993 which is a division of application Ser. No. 07/388,156 filed Jul. 28, 1989, which issued Sep. 13, 1994, as U.S. Pat. No. 5,347,632, application Ser. No. 07/388,156 being a continuation in part of application Ser. No. 07/328,790 filed Mar. 23, 1989 now abandoned, which itself was a continuation in part of application Ser. No. 07/219,931, filed Jul. 15, 1988 now abandoned.

BACKGROUND OF THE INVENTION

1. Field of Use

This invention relates generally to a method for presenting advertising in a distributed processing, interactive computer network intended to provide very large numbers of simultaneous users; e.g., millions, access to an interactive service having large numbers; e.g., thousands, of applications which include pre-created, interactive text/graphic sessions; and more particularly, to a method for presenting advertising to service users during interactive sessions, the method featuring steps for presenting advertising concurrently with applications, the advertising being organized as data which is stored for presentation and replenished at the user sites so as to minimize interference with retrieval and presentation of application data; the method also featuring steps for individualizing the advertising presented based on user characterizations defined by service interaction and/or other data such as user demographics and geographical location.

2. Prior Art

Interactive computer networks are not new. Traditionally they have included conventional, hierarchical architectures wherein a central host computer responds to the information requests of multiple users. An illustration would be a time-sharing network in which multiple users, each at a remote terminal, log onto a host that provides data and software resource for sequentially receiving user data processing requests, executing them and supplying responses back to the users.

While such networks have been successful in making the processing power of large computers available to many users, problems have existed with them. For example, in such networks, the host has been required to satisfy all the user data processing requests. As a result, processing bottlenecks arise at the host that cause network slowdowns and compel expansion in computing resources; i.e., bigger and more complex computer facilities, where response times are sought to be held low in the face of increasing user populations.

Host size and complexity, however, are liabilities for interactive networks recently introduced to offer large numbers of the public access to transactional services such as home shopping, banking, and investment maintenance, as well as informational services concerning entertainment, business and personal matters. As can be appreciated, commercial interactive networks will have to provide attractive services at low cost and with minimal response times in order to be successful. Unlike military and governmental networks where, because of the compulsory nature of the service performed, costs, content and efficiency are of secondary concern, in commercial services, since use is predominantly elective, and paid for by the consumer, costs will have to be held low, content made interesting and response times reduced in order to attract and hold both users who would subscribe to the service and merchandisers who would rely on it as a channel of distribution for their goods and services. Accordingly, if the service delivery system is allowed to increase in size and complexity, either unchecked or unsubsidized, higher use costs would have to be charged to recover the larger capital and operating expenses, with the negatively, spiraling effect that fewer users could be attracted and be available over which to spread the costs for sustaining the service.

In the past, other suppliers of mass-media services such as radio, television, newspapers, and magazines, have sought to hold access and subscription prices to affordable levels by relying on advertising income to offset the costs of providing their users with the benefits of technological advance. However, in the case of interactive computer services, it has not been apparent how advertising could be introduced without adversely affecting service speed and content quality, which as noted, are considered essential elements for service success.

Particularly, in an interactive service, if advertising were provided in a conventional manner; as for example, by providing the advertising as additional data to be supplied to and presented at the user sites, the effort would compete with the supplying and presentation of service application data, and have the undesirable effect of diminishing service response time. More specifically, if advertising were supplied conventionally from a host to a user site, the application traffic, which constitutes the substance of the service, would have to compete with advertising for network communication resources. Yet additionally, even if traffic conflicts were somehow avoided, the presentation of the service applications would have to be interrupted and delayed; for example like television and radio commercials, as advertising content was presented to the user. The effect of these anticipated delays would be to degrade application response time and diminishing service attractiveness.

Additionally, in view of the need to maintain the user's interest in application content so as to drive the interactive session, it has not been apparent how advertising matter could be provided without distracting the user or disrupting the session. Where service response time is diminished for the sake of advertising which is either irrelevant or distasteful, insult is added to the injury, increasing the likelihood the user, and service, will be, simply, turned off.

SUMMARY OF INVENTION

Accordingly, it is an object of this invention to provide a method for presenting advertising in an interactive service.

It is another object of this invention to provide a method for presenting advertising in an interactive service which method enables the presentation of advertising to be integrated with presentation of service applications.

It is a yet another object of this invention to provide a method for presenting advertising in an interactive service which method minimizes the potential for interference between the supply of interactive-service applications and advertising.

It is still another object of this invention to provide a method for presenting advertising which minimizes the potential for interference between presentation of interactive-service applications and advertising.

It is yet a further object of this invention to provide a method for presenting advertising in an interactive service which method enables the advertising presented to be individualized to the user to whom it is presented in order to increase the likelihood the advertising will be of interest to the user.

And, it is still a further object of this invention to provide a method for presenting advertising in an interactive service which method enables the user to transactionally interact with the advertising presented.

Briefly, the method for presenting advertising in accordance with this invention achieves the above-noted and other objects by featuring steps for presenting advertising concurrently with service applications at the user reception system; i.e., terminal. In accordance with the method, the advertising is structured in a manner comparable to the manner in which the service applications are structured. This enables the applications to be presented at a first portion of a display associated with the reception system and the advertising to be presented concurrently at a second portion of the display. Further, in accordance with the method, the user reception system at which the advertising is presented includes facility for storing and managing the advertising so that it can be pre-fetched from the network and staged at the reception system in anticipation of being called for presentation. This minimizes the potential for communication line interference between application and advertising traffic and makes the advertising available at the reception system so as not to delay presentation of the service applications. Yet further the method features steps for individualizing the advertising supplied to enhance potential user interest by providing advertising based on a characterization of the user as defined by the users interaction with the service, user demographics and Geographical location. Yet additionally, advertising is provided with transactional facilities so that users can interact with it.

In preferred form, the method includes step for organizing advertising and applications as objects that collectively include presentation data and executable program instructions for generating the advertising and applications at the reception system. In accordance with the preferred form of the method, advertising and application objects are selectively distributed in the service network in accordance with a predetermined plan based on the likelihood the applications and advertising will be called by the respective user reception systems.

Also in preferred form, the method-includes step for maintaining an advertising object identification queue, and an advertising object store that are replenished based on predetermined criteria as advertising is called for association and Presentation with applications. In accordance with the method, as applications are executed at the reception system, the application objects provide generalized calls for advertising. The application calls for advertising are subsequently forwarded to the reception system advertising queue management facility which, in turn supplies an identification of advertising whose selection has been individualized to the user based on, as noted, the user's prior interaction history with the service, demographics and local. Thereafter, the object identification for the advertising is passed to the object store to determine if the object is available at the reception system. In preferred form, if the advertising object is not, a sequence of alternative advertising object identifications can be provided which if also are unavailable at the reception system, will result in an advertising object being requested from the network. In this way, advertising of interest can be targeted to the user and secured in time-efficient manner to increase the likelihood of user interest and avoid service distraction.

DESCRIPTION OF THE DRAWINGS

The above and further objects, features and advantages of the invention will become clear from the following more detailed description when read with reference to the accompanying drawings in which:

FIG. 6 is a schematic diagram that illustrates the protocol which might be used by a reception system for supporting applications and advertising in accordance with the method of the present invention;

DESCRIPTION OF THE PREFERRED EMBODIMENT

General System Description

Figure 1:
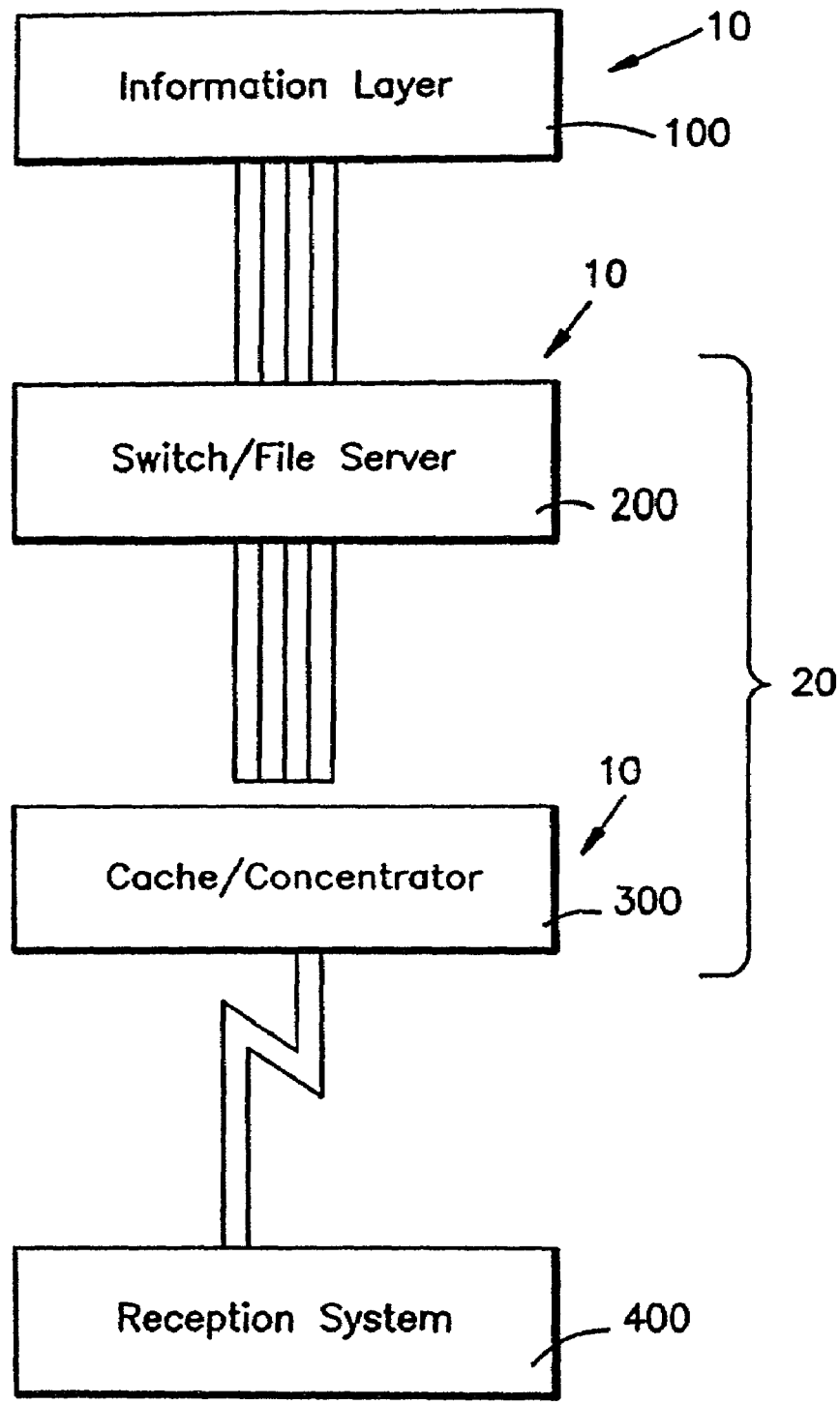
FIG. 1 is a block diagram of the interactive computer network in which the method of the present invention may be practiced.
Figure 2:
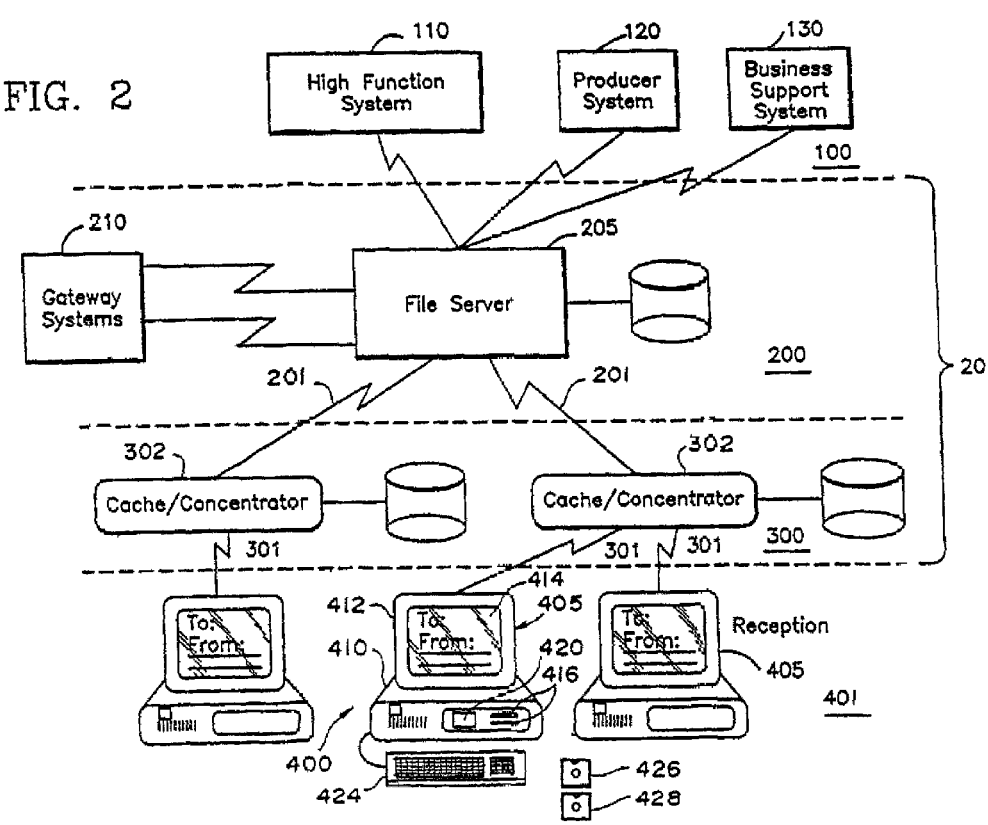
FIG. 2 is a schematic diagram of the network illustrated in FIG. 1.

FIGS. 1 and 2 show a network in which the method of the present invention for presenting advertising might be used. As seen the network, designated 10, includes a plurality of reception units within reception layer 401 for displaying information and providing transactional services. In this arrangement, many users each access network 10 with a conventional personal computer, e.g., one of the IBM or IBM-compatible type, which has been provided with application software to constitute a reception system (RS) 400.

As seen in FIG. 1, interactive network 10 uses a layered structure that includes an information layer 100, a switch/file server layer 200, and cache/concentrator layer 300 as well as reception layer 401. This structure maintains active application databases and delivers requested parts of the databases on demand to the plurality of RS 400's, shown in FIG. 2. As seen in FIG. 2, cache/concentrator layer 300 includes a plurality of cache/concentrator units 302, each of which serve a plurality of RS 400 units over lines 301. Additionally, switch/file server layer 200 is seen to include a server unit 205 connected to multiple cache/concentrator units 302 over lines 201. Still further, server unit 205 is seen to be connected to information layer 100 and its various elements, which act as means for producing, supplying and maintaining the network databases and other information necessary to support network 10. Continuing, switch/filer layer 200 is also seen to include gateway systems 210 connected to server 205. Gateways 210 couple layer 200 to other sources of information and data; e.g., other computer systems. As will be appreciated by those skilled in the art, layer 200, like layers 401 and 300, could also include multiple servers, gateways and information layers in the event even larger numbers of users were sought to be served.

Continuing with reference to FIG. 2, in preferred form, each RS 400 is seen to include a personal computer 405 having a CPU 410 including a microprocessor (as for example, one of the types made by INTEL corporation in its X'86 family of microprocessors), companion, RAM and ROM memory and other associated elements, such as monitor 412 with screen 414 and a keyboard 424. Further, personal computer 405 may also include one or two floppy disk drives 416 for receiving diskettes 426 containing application software used to support the interactive service and facilitate the interactive sessions with network 10. Additionally, personal computer 405 would include operating systems software; e.g., MS-DOS, supplied on diskettes 428 suitable for the personal computer being used. Personal computer 405 still further may also include a hard-disk drive 420 for storing the application software and operating system software which may be transferred from diskettes 426 and 428 respectfully.

Once so configured, each RS 400 provides: a common interface to other elements of interactive computer network 10; a common environment for application processing; and a common protocol for user-application conversation which is independent of the personal computer brand used. RS 400 thus constitutes a universal terminal for which only one version of all applications on network 10 need be prepared, thereby rendering the applications interpretable by a variety of brands of personal computers.

RS 400 formulated in this fashion is capable of communication with the host system to receive information containing either of two types of data, namely objects and messages. Objects have a uniform, self-defining format known to RS 400, and include data types, such as interpretable programs and presentation data for display at monitor screen 414 of the user's personal computer 405. Applications presented at RS 400 are partitioned into objects which represent the minimal units available from the higher levels of interactive network 10 or RS 400. In this arrangement, each application partition typically represents one screen or a partial screen of information, including fields filled with data used in transactions with network 10. Each such screen, commonly called a page, is represented by its parts and is described in a page template object, discussed below.

Applications, having been partitioned into minimal units, are available from higher elements of network 10 or RS 400, and are retrieved on demand by RS 400 for interpretive execution. Thus, not all partitions of a partitioned application need be resident at RS 400 to process a selected partition, thereby raising the storage efficiency of the user's RS 400 and minimizing response time. Each application partition is an independent, self-contained unit and can operate correctly by itself. Each partition may refer to other partitions either statically or dynamically static references are built into the partitioned application; while dynamic references are created from the execution of program logic using a set of parameters, such as user demographics or locale. Partitions may be chosen as part of the RS processing in response to user created events, or by selecting a key word of the partitioned application (e.g., "JUMP" or "INDEX," discussed below), which provides random access to all services represented by partitioned applications having key words.

Objects provide a means of packaging and distributing partitioned applications. As noted, objects make up one or more partitioned applications, and are retrieved on demand by a user's RS 400 for interpretive execution and selective storage. All objects interpreted by RS 400, thereby enabling applications to be developed independently of the personal computer brand used.

Objects may be nested within one another or referenced by an object identifier (object-id) from within their data structure. References to objects permit the size of objects to be minimized. Further, the time required to display a page is minimized when referenced objects are stored locally at RS 400 (which storage is determined by prior usage meeting certain retention criteria), or have been pre-fetched, or in fact, are already used for the current page.

Objects carry application program instructions and/or information for display at-monitor screen 414 of RS 400. Application program objects, called pre-processors and post-processors, set up the environment for the user's interaction with network 10 and respond to events created when the user inputs information at keyboard 424 of RS. Such events typically trigger a program object to be processed, causing one of the following: sending of transactional information to the co-applications in one layer of the network 10; the receiving of information for use in programs or for presentation in application dependent fields on monitor screen 414; or the requesting of new objects to be processed by RS 400. Such objects may be part of the same application or a completely new application.

The RS 400 supports a protocol by which the user and the partitioned applications communicate. All partitioned applications are designed knowing that this protocol will be supported in RS 400. Hence, replication of the protocol in each partitioned application is avoided, thereby minimizing the size of the partitioned application.

RS 400 includes a means to communicate with network 10 to retrieve objects in response to events occurring at RS 400 and to send and receive messages.

RS 400 includes a means to selectively store objects according to a predetermined storage criterion, thus enabling frequently used objects to be stored locally at the RS, and causing infrequently used objects to forfeit their local storage location. The currency of objects stored locally at the RS 400 is verified before use according to the object's storage control parameters and the storage criterion in use for version checking.

Selective storage tailors the contents of the RS 400 memory to contain objects representing all or significant parts of partitioned applications favored by the user. Because selective storage of objects is local, response time is reduced for those partitioned applications that the user accesses most frequently.

Since much of the application processing formerly done by a host computer in previously known time-sharing networks is now performed at the user's RS 400, the higher elements of network 10, particularly layer 200, have as their primary functions the routing of messages, serving of objects, and line concentration. The narrowed functional load of the higher network elements permits many more users to be serviced within the same bounds of computer power and I/O capability of conventional host-centered architectures.

Network 10 provides information on a wide variety of topics, including, but not limited to news, industry, financial needs, hobbies and cultural interests. Network 10 thus eliminates the need to consult multiple information sources, giving users an efficient and timesaving overview of subjects that interest them.

The transactional features of interactive network 10 saves the user time, money and frustration by reducing time spent traveling, standing in line, and communicating with sales personnel. The user may, through RS 400 bank, send and receive messages, review advertising provided in accordance with the method of the present invention, place orders for merchandise, and perform other transactions.

In preferred form, network 10 provides information, advertising and transaction processing services for a large number of users simultaneously accessing the network via the public switched telephone network (PSTN), broadcast, and/or other media with their RS 400 units. Services available to the user include display of information such as movie reviews, the latest news, airlines reservations, the purchase of items such as retail merchandise and groceries, and quotes and buy/sell orders for stocks and bonds. Network 10 provides an environment in which a user, via RS 400 establishes a session with the network and accesses a large number of services. These services are specifically constructed applications which as noted are partitioned so they may be distributed without undue transmission time, and may be processed and selectively stored on a users RS 400 unit.

System Configuration

As shown in FIG. 1, interactive computer network 10 includes four layers: information layer 100, switch and file server layer 200, concentrator layer 300, and reception layer 401.

Information layer 100 handles: (1) the production, storage and dissemination of data and (2) the collection and off-line processing of such data from each RS session with the network 10 so as to permit the targeting of information and advertising to be presented to users and for traditional business support.

Switch and file server layer 200 and cache/concentrator layer 300 together constitute a delivery system 20 which delivers requested data to the RS 400's of reception layer 401 and routes data entered by the user or collected at RS 400's to the proper application in network 10. With reference to FIG. 2, the information used in a RS 400 either resides locally at the RS 400, or is available on demand from cache/concentrator 300 or the file the server 205, via the gateway 210, which may be coupled to external providers, or is available from information layer 100.

There are two types of information in the network 10 which are utilized by the RS 400: objects and messages.

Objects include the information requested and utilized by the RS 400 to permit a user to select specific parts of applications, control the flow of information relating to the applications, and to supply information to the network. Objects are self-describing structures organized in accordance with a specific data object architecture, described below. Objects are used to package presentation data and program instructions required to support the partitioned applications and advertising presented at a RS 400. Objects are distributed on demand throughout interactive network 10. Objects may contain: control information; program instructions to set up an application processing environment and to process user or network created events; information about what is to be displayed and how it is to be displayed; references to programs to be interpretively executed; and references to other objects, which may be called based upon certain conditions or the occurrence of certain events at the user's personal computer, resulting in the selection and retrieval of other partitioned applications packaged as objects.

Messages are information provided by the user or the network and are used in fields defined within the constructs of an object, and are seen on the user's RS monitor 412, or are used for data processing at RS 400. Additionally, and as more fully described hereafter, messages are the primary means for communication within and without the network. The format of messages is application dependent. If the message is input by the user, it is formatted by the partitioned application currently being processed on RS 400. Likewise, and with reference to FIG. 2, if the data are provided from a co-application database residing in delivery system 20, or accessed via gateway 210 or high function system 110 within the information layer 100, the partitioned application currently being processed on RS 400 causes the message data to be displayed in fields on the user's display monitor as defined by the particular partitioned application.

All active objects reside in file server 205. Inactive objects or objects in preparation reside in producer system 120. Objects recently introduced into delivery system 20 from the producer system 120 will be available from file server 205, but, may not be available on cache/concentrator 302 to which the user's RS 400 has dialed. If such objects are requested by the RS 400, the cache/concentrator 302 automatically requests the object from file server 205. The requested object is routed back to the requesting cache/concentrator 302, which automatically routes it to the communications line on which the request was originally made, from which it is received by the RS 400.

The RS 400 is the point of application session control because it has the ability to select and randomly access objects representing all or part of partitioned applications and their data. RS 400 processes objects according to information contained therein and events created by the user on personal computer 405.

Applications on network 10 act in concert with the distributed partitioned applications running on RS 400. Partitioned applications constructed as groups of objects and are distributed on demand to a user's RS 400. An application partition represents the minimum amount of information and program logic needed to present a page or window, i.e., portion of a page presented to the user, perform transactions the interactive network 10, and perform traditional data processing operations, as required, including selecting another partitioned application to be processed upon a user generated completion event for the current partitioned application.

Objects representing all or part of partitioned applications may be stored in a user's RS 400 if the objects meet certain criteria, such as being non-volatile, non-critical to network integrity, or if they are critical to ensuring reasonable response time. Such objects are either provided on diskettes 426 together with RS 400 system software used during the installation procedure or they are automatically requested by RS 400 when the user makes selections requiring objects not present in RS 400. In the latter case, RS 400 requests from cache/concentrator layer 300 only the objects necessary to execute the desired partitioned application.

Reception system application software 426 in preferred form is provided for IBM and IBM-compatible brands of personal computers 405, and all partitioned applications are constructed according to a single architecture which each such RS 400 supports. With reference to FIG. 2, to access network 10, a user preferably has a computer 405 with at least 512K RAM and a single disk drive 416. The user typically accesses network 10 using a 1,200 or 2,400 bps modem (not shown). To initiate a session with network 10, objects representing the logon application are retrieved from the user's personal diskette, including the R.S. application software, which was previously set up during standard installation and enrollment procedures with network 10. Once communication between RS 400 and cache/concentrator layer 300 has been established, the user begins a standard logon procedure by inputting a personal entry code. Once the logon procedure is complete, the user can begin to access various desired services (i.e., partitioned applications) which provide display of requested information and/or transaction operations.

Applications and Pages

Figure 3A:
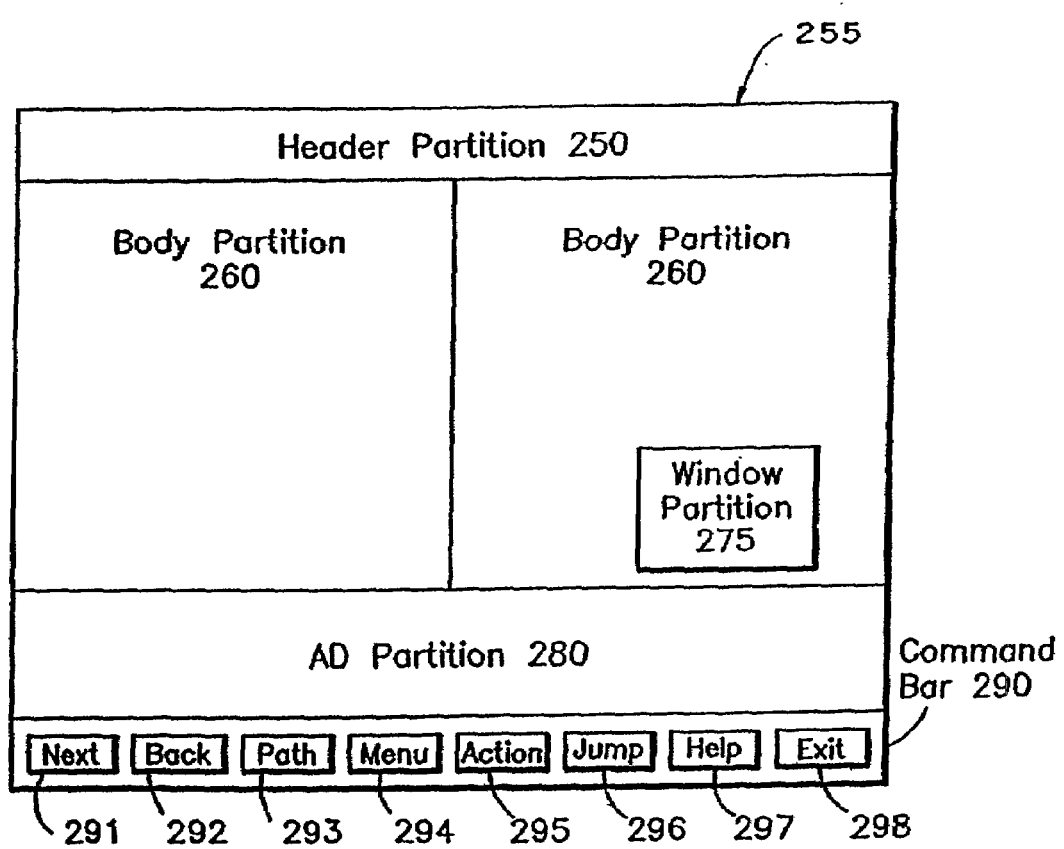
FIGS. 3a and 3b are plan views of a display screen for a user reception system at which advertising can be presented to a user in accordance with the method of the present invention.

Applications, i.e., information events, are composed of a sequence of one or more pages opened at screen 414 of monitor 412. This is better seen with reference to FIGS. 3*a* and 3*b* where a page 255 is illustrated as might appear at screen 414 of monitor 412. With reference to FIG. 3*a*, each page 255 is formatted with a service interface having page partitions 250, 260, 280, and 290 (not to be confused with application partitions). Window page partitions 275, well known in the art, are also available and are opened and closed conditionally on page 255 upon the occurrence of an event specified in the application being run. Each page partition 250, 260, 280 and 290 and window 275 is made up of a page element which defines the content of the partition or window.

Figure 3B:
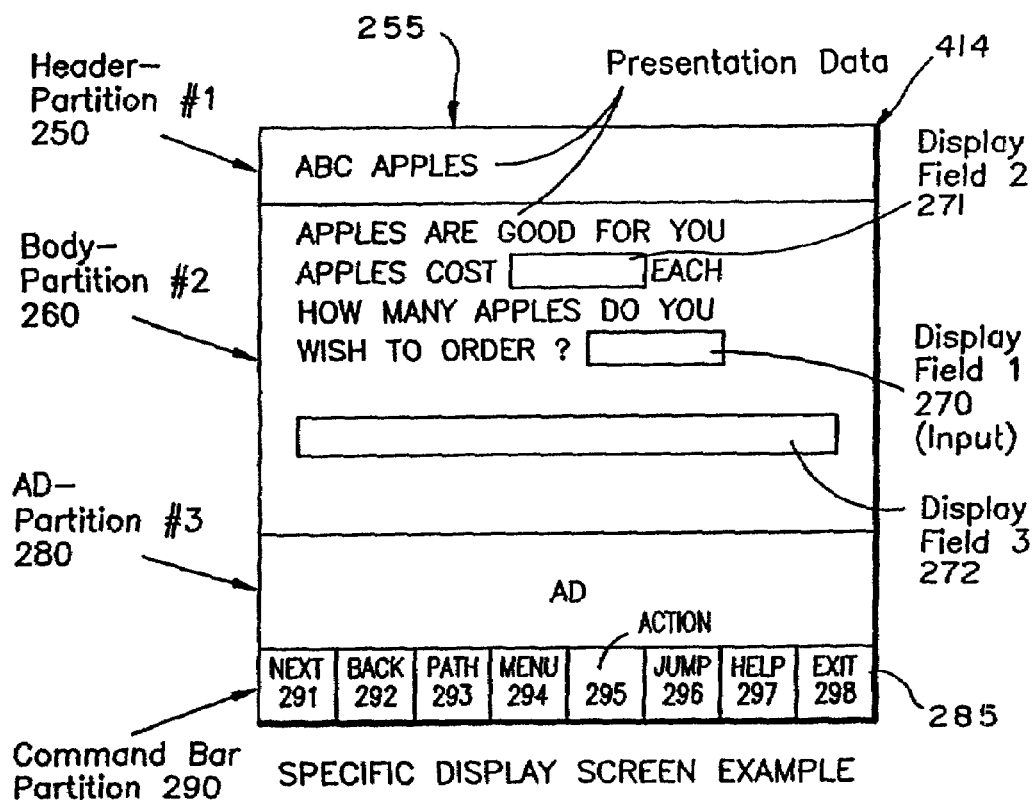

Each page 255 includes: a header page partition 250, which has a page element associated with it and which typically conveys information on the page's topic or sponsor; one or more body page partitions 260 and window page partitions 275, each of which is associated with a page element which as noted gives the informational and transactional content of the page. For example, a page element may contain presentation data selected as a menu option in the previous page, and/or may contain prompts to which a user responds in pre-defined fields to execute transactions. As illustrated in FIG. 3*b*, the page element associated with body page partition 260 includes display fields 270, 271, 272. A window page partition 275 seen in FIG. 3*a* represents the same informational and transactional capability as a body partition, except greater flexibility is provided for its location and size.

Continuing with reference to FIG. 3*a*, in accordance with the invention, advertising 280 is provided over network 10, like page elements, also includes information for display on page 255, and may be included in any partition of a page. Advertising 280 is presented to the user on an individualized basis from queues of advertising object identifications (ids) that are constructed off-line by business system 130, and sent to file server 205 where they are accessible to each RS 400.

Individualized queues of advertising object ids are constructed based upon data collected on the partitioned applications that were accessed by a user, and upon events the user generated in response to applications. The data are collected and reported by RS 400 to a data collection co-application in file server 205 for later transmission to business system 130. In addition to application access and use characteristics, a variety of other parameters, such as user demographics or postal ZIP code; may be used as targeting criteria. From such data, queues of advertising object ids are constructed that are targeted to either individual users or to sets of users who fall into certain groups according to such parameters. Stated otherwise, the advertising presented is individualized to the respective users based on characterizations of the respective users as defined by the interaction history with the service and such other information as user demographics and locale. As will be appreciated by those skilled in the art, conventional marketing analysis techniques can be employed to establish the user characterizations based on the collected application usage data above noted and other information.

Also with reference to FIG. 3*b*, the service interface is seen to include a command region 285 which enables the user to interact with the network RS 400 and other elements of network 10, so as to cause such operations as navigating from page to page, performing a transaction, or obtaining more information about other applications. As shown in FIG. 3*b*, interface region 285 includes a command bar 290 having a number of commands 291–298 which the user can execute. The functions of commands 291–298 are discussed in greater detail below.

Network Objects

As noted above, in conventional time-sharing computer networks, the data and program instructions necessary to support user sessions are maintained at a central host computer. However, that approach has been found to create processing bottlenecks as greater numbers of users are connected to the network; bottlenecks which increases in processing power and complexity; e.g., multiple hosts of greater computing capability, if the network is to meet demand. Further, such bottlenecks have been found to also slow response time as more users are connected to the network and seek to have their requests for data processing answered.

The consequences of the host processing bottlenecking is to either compel capital expenditures to expand host processing capability, or accept longer response times; i.e., a slower network, and risk user dissatisfaction.

However, even in the case where additional computing power is added, and where response time is allowed to increase, eventually the host becomes user saturated as more and more users are sought to be served by the network. The network described above, however, is designed to alleviate the effects of host-centered limitations, and extend the network saturation point. This objective is achieved by reducing the demand on the host for processing resources by structuring the network so that the higher network levels act primarily to maintain and supply data and programs to the lower levels of the network, particularly RS 400, which acts to manage and sustain the user screen displays.

More particularly, the described network features procedures for parsing the network data and program instructions required to support the interactive user sessions into packets, referred to as objects, and distributing them into the network where they can be processed at lower levels, particularly, reception system 400.

In accordance with the method of the present invention, the screens presented at the user's monitor are each divided into addressable partitions shown in FIG. 3*a*, and the display text and graphics necessary to make up the partitions, as well as the program instructions and control data necessary to deliver and sustain the screens and partitions; are formulated from pre-created objects. Further, the objects are structured in accordance with an architecture that permits the displayed data to be relocatable on the screen, and to be reusable to make up other screens and other sessions, either as pre-created and stored sessions or interactive sessions, dynamically created in response to the user's requests.

Figure 4A:
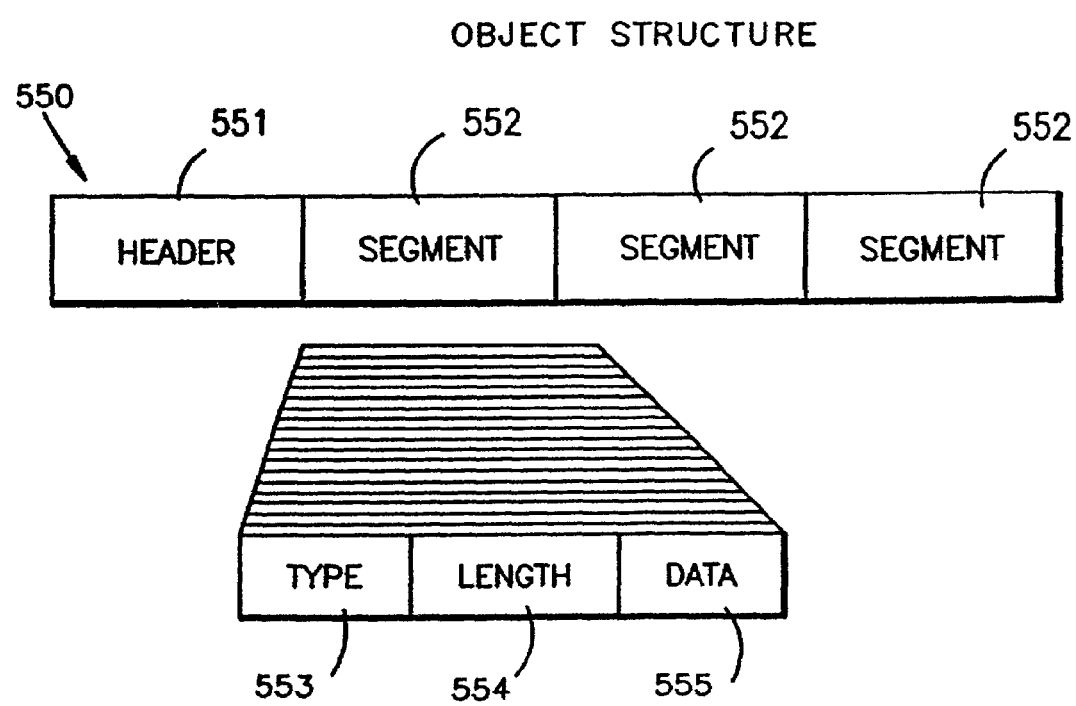
FIGS. 4a, 4b, 4c and 4d are schematic drawings that illustrate the structure of objects, and object segments that may be used for advertising and applications in accordance with the method of the present invention.
Figure 4B:
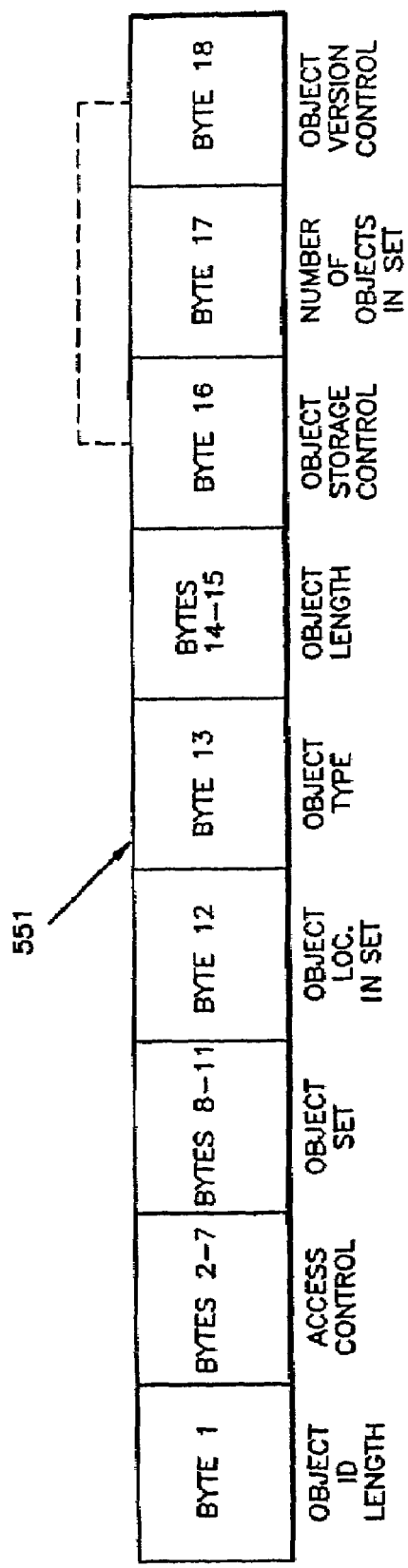
Figure 4C:
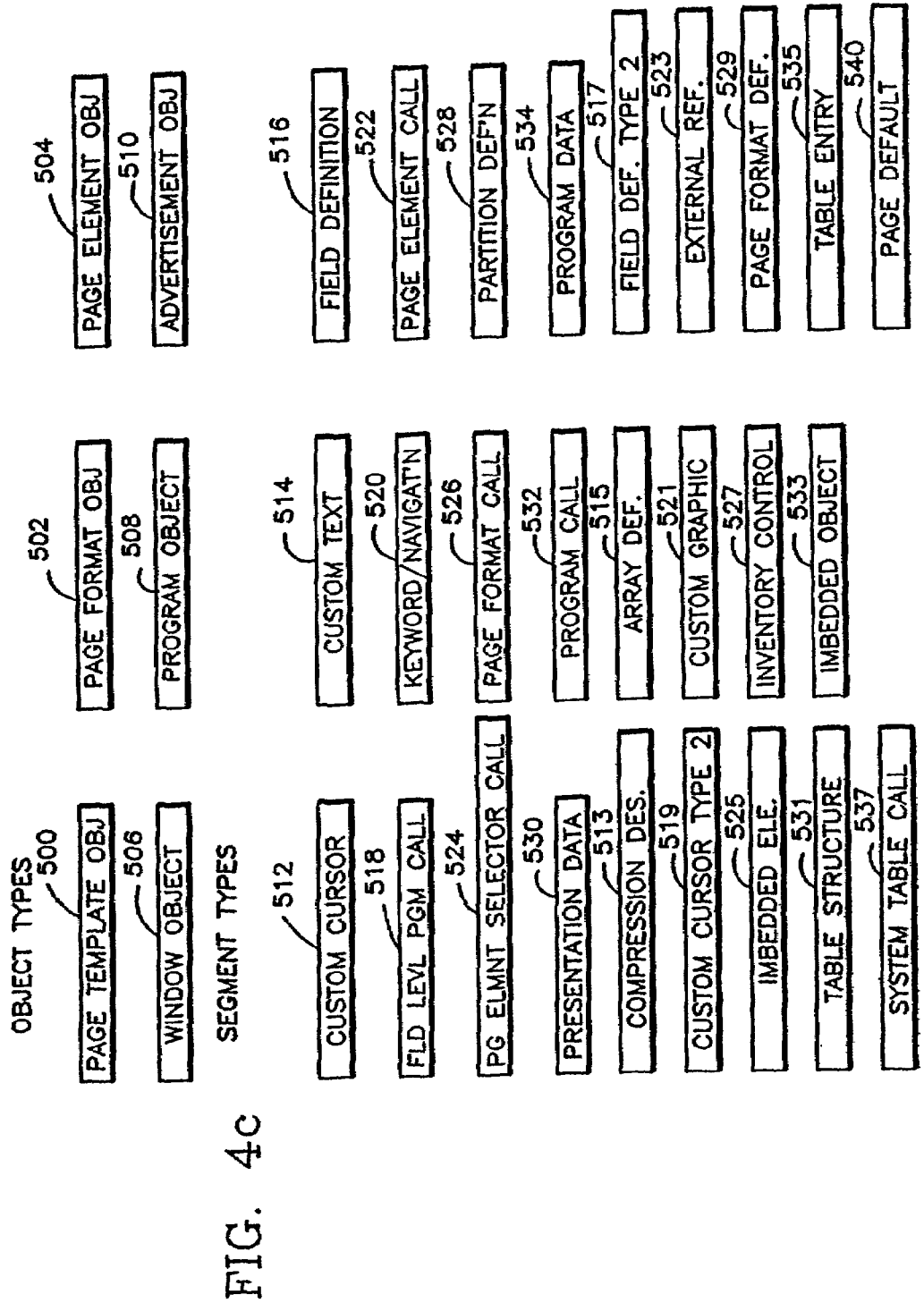

As shown in FIG. 4*c*, the network objects are organized as a family of objects each of which perform a specific function in support of the interactive session. More particularly, in accordance with the preferred form of the invention, the network object family is seen to include 6 members: page format objects 502, page element objects 504, window objects 506, program objects 508, advertisement objects 510 and page template objects 500.

Within this family, page format objects 502 are designed to define the partitioning 250 to 290 of the monitor screen shown in FIG. 3*a*. The page format objects 502 provide a means for pre-defining screen partitions and for ensuring a uniform look to the page presented on the reception system monitor. They provide the origin; i.e., drawing points, and dimensions of each page partition and different values for presentation commands such as palette and background color.

Page format objects 502 are referenced whenever non-window data is to be displayed and as noted ensure a consistent presentation of the page. In addition, page format objects 502 assures proper tessellation or "tiling" of the displayed partitions.

Page element objects 504, on the other hand, are structured to contain the display data; i.e., text and graphic, to be displayed which is mapped within screen partitions 250 to 290, and to further provide the associated control data and programs. More specifically, the display data is described within the object as NAPLPS data, and includes, PDI, ASCII, Incremental Point and other display encoding schemes. Page element objects also control the functionality within the screen partition by means of field definition segments 516 and program call segments 532, as further described in connection with the description of such segments hereafter. Page element objects 504 are relocatable and may be reused by many pages. To enable the displayable data to be relocated, display data must be created by producers in the NAPLPS relative mode.

Continuing with reference to FIG. 4*c*, window objects 506 include the display and control data necessary to support window partitions 275 best seen in FIG. 3*a*. Windows contain display data which overlay the base page and control data which supersede the base page control data for the underlying screen during the duration of the window. Window objects 506 contain data which is to be displayed or otherwise presented to the viewer which is relatively independent from the rest of the page. Display data within windows overlay the base page until the window is closed. Logic associated with the window supersedes base page logic for the duration of the window. When a window is opened, the bit map of the area covered by window is saved and most logic functions for the overlaid page are deactivated. When the window is closed, the saved bit map is swapped onto the screen, the logic functions associated with the window are disabled, and prior logic functions are reactivated.

Windows are opened by user or program control. They do not form part of the base page. Windows would typically be opened as a result of the completion of events specified in program call segments 532.

Window objects 506 are very similar in structure to page element objects 504. The critical difference is that window objects 506 specify their own size and absolute screen location by means of a partition definition segment 528.

Program objects 508 contain program instructions written in a high-level language called TRINTEX Basic Object Language, i.e., TBOL, described in greater detail hereafter, which may be executed on RS 400 to support the application. More particularly, program objects 508 include interpretable program code, executable machine code and parameters to be acted upon in conjunction with the presentation of text and graphics to the reception system monitors.

Program objects 508 may be called for execution by means of program call segments 532, which specify when a program is to be executed (event), what program to execute (program pointer), and how programs should run (parameters).

Programs are treated as objects as objects to conform to the open-ended design philosophy of the data object architecture (DOA), allowing the dissemination of newly developed programs to be easily and economically performed. As noted above, it is desirable to have as many of these program objects staged for execution at or as close to RS 400 as possible.

Still further, in accordance with the method of the present invention, advertising objects 510 include the text and graphics that may be presented at ad partition 280 presented on the monitor screen as shown in FIG. 3*b*.

Finally, the object family includes page template objects 500. Page template objects 500 are designed to define the components of the full screen presented to the viewer. Particularly, page template objects 500 include the entry point to a screen, the name of the page format objects which specify the various partitions a screen will have and the page element object that contain the display data and partitioning parameters for the page.

Additionally, page template object 500 includes the specific program calls required to execute the screens associated application being presented to the user, and may serve as the means for the user to selectively move through; i.e., navigate the pages of interest which are associated with various applications. Thus, in effect, page template objects 500 constitute the "recipe" for making up the collection of text and graphic information required to make the screens to be presented to the user.

Also, in accordance with the invention, objects 500 to 510 shown in FIG. 4*c* are themselves made up of further sub-blocks of information that may be selectively collected to define the objects and resulting pages that ultimately constitute the application presented to the user in an interactive text and graphic session.

More specifically and as shown schematically in FIG. 4a, objects 500 to 510 are predefined, variable length records consisting of a fixed length header 551 and one or more self-defining record segments 552 a list of which is presented in FIG. 4c as segment types 512 to 540.

In accordance with this design, and as shown in FIG. 4b, object header 551 in preferred form is 18 bytes in length and contains a prescribed sequence of information which provides data regarding the object's identification, its anticipated use, association to other objects, its length and its version and currency.

More particularly, each of the 18 bytes of object header 551 are conventional hexadecimal, 8 bit bytes and are arranged in a fixed pattern to facilitate interpretation by network 10. Particularly, and as shown in FIG. 4b, the first byte of header 551; i.e., byte 1, identifies the length of the object ID in hexadecimal. The next six bytes; i.e., bytes 2 to 7, are allocated for identifying access control to the object so as to allow creation of closed user groups to whom the object(s) is to be provided. As will be appreciated by those skilled in the art, the ability to earmark objects anticipation of user requests enables the network to anticipate requests and pre-collect objects from large numbers of them maintained to render the network more efficient and reduce response time. The following 4 bytes of header 551; bytes 8 to 11, are used to identify the set of objects to which the subject object belongs. In this regard, it will be appreciated that, again; for speed of access and efficiency of selection, the objects are arranged in groups or sets which are likely to be presented to user sequentially in presenting the page sets; i.e., screens that go to make up a session.

Following identification of the object set, the next byte in header 551; i.e., byte 12, gives the location of the subject object in the set. As will be appreciated here also the identification is provided to facilitate ease of object location and access among the many thousands of objects that are maintained to, thereby, render their selection and presentation more efficient and speedy.

Thereafter, the following bytes of header 551; i.e., byte 13, designates the object type; e.g., page format, page template, page element, etc. Following identification of the object type, two bytes; i.e., bytes 14, 15, are allocated to define the length of the object, which may be of whatever length is necessary to supply the data necessary, and thereby provides great flexibility for creation of the screens. Thereafter, a single byte; i.e., byte 16, is allocated to identify the storage characteristic for the object; i.e., the criterion which establishes at what level in network 10 the object will be stored, and the basis upon which it will be updated. At least a portion of this byte; i.e., the higher order nibble (first 4 bits reading from left to right) is associated with the last byte; i.e., byte 18, in the header which identifies the version of the object, a control used in determining how often in a predetermined period of time the object will be updated by the network.

Following storage characteristic byte 16, header 551 includes a byte; i.e., 17, which identifies the number of objects in the set to which the subject object belongs. Finally, and as noted above, header 551 includes a byte; i.e., 18, which identifies the version of the object. Particularly the object version is a number to establish the control for the update of the object that are resident at RS 400.

As shown in FIG. 4a, and as noted above, in addition to header 551, the object includes one more of the various segment types shown in FIG. 4c.

Segments 512 to 540 are the basic building blocks of the objects. And, as in the case of the object, the segments are also self-defining. As will be appreciated by those skilled in the art, by making the segments self-defining, changes in the objects and their use in the network can be made without changing pre-existing objects.

As in the case of objects, the segments have also been provided with a specific structure. Particularly, and as shown in FIG. 4a, segments 552 consists of a designation of segment type 553, identification of segment length 554, followed by the information necessary to implement the segment and its associated object 555; e.g., either, control data, display data or program code.

In this structure, segment type 553 is identified with a one-byte hexadecimal code which describes the general function of the segment. Thereafter, segment length 554 is identified as a fixed two-byte long field which carries the segment length as a hexadecimal number in INTEL format; i.e., least significant byte first. Finally, data within segments may be identified either by position, or keyword, depending on the specific requirements of the segment.

The specific structure for the objects and segments in shown in FIG. 4c and is described below. In that description the following notation convention is used:

| | |
|---|---|
| < > | - mandatory item |
| ( ) | - optional item |
| . . . | - item may be repeated |
| \|item\| \|item\| | |
| < > ( ) | - items in a column indicate either/or |
| \|item\| \|item\| | |

The structure for objects is:
PAGE TEMPLATE OBJECT,
[<header> (compression descriptor)  (page element call) . . . (program call) . . . (page element selector) (system table call) . . . (external reference) (keyword/navigation) . . . ];.

As noted above, page format objects 502 are designed to define the partitioning 250 to 290 of monitor screen 414 shown in FIG. 3a.

PAGE FORMAT OBJECT,
[<header> (compression descriptor) (page defaults) <partition definition>];
PAGE ELEMENT OBJECT"
[<header> (compression descriptor) (presentation data) . . . (program call) . . . (custom cursor) . . . (custom text) . . . (field definition) . . . (field-level program call) . . . (custom cursor type 2) . . . (custom graphic) . . . (field definition type 2) . . . (array definition) . . . (inventory control)];

Page element objects, as explained, are structured to contain the display data; i.e., text and graphics, to be presented at screen partitions 250 to 290.

WINDOW OBJECT,
[<header> (compression description) <partition definition> (page element call) (presentation data) (program call) (custom cursor) . . . (custom text) . . . (custom cursor type 2) (custom graphic) . . . (field definition) . . . (field level program call) . . . (field definition type 2) (array definition) (inventory control)];

As noted, window objects include display and control necessary to support window partition at screen 414.
PROGRAM OBJECTS,
[<header> (compression descriptor) <program data> . . . ].

Program objects, on the other hand, contain program instructions written in higher-level language which may be executed at RS 400 to support the application.

ADVERTISEMENT OBJECT,

[<header> (compression descriptor) (presentation data) . . . (program call) . . . (custom cursor) . . . (custom text) . . . (field definition) . . . (field-level program call) . . . (custom cursor type 2) . . . (custom graphic) . . . (field definition type 2) . . . (array definition) . . . (inventory control)];

In accordance with the invention, and as can be seen, advertisement objects are substantially the same as page element objects, with the difference being that, as their name implies, their subject matter is selected to concern advertising.

Continuing, the structure for the object segments follows from the above description, and is as described more fully in parent application Ser. No. 388,156 now issued as U.S. Pat. No. 5,347,632, the contents of which patent are incorporated herein by reference.

Network Messages

In addition to the network objects, and the display data, control data, and the program instructions they contain as previously described, network 10 also exchanges information regarding the support of user sessions and the maintenance of the network as "messenger". Specifically, messages typically relate to the exchange of information associated with initial logon of a reception system 400 to network 10, dialogue between RS 400 and other elements and communications by the other network elements amongst themselves.

To facilitate message exchange internally, and through gateway 210 to entities externally to network 10, a protocol termed the "Data Interchange Architecture" (DIA) is used to support the transport and interpretation of information. More particularly, DIA enables: communications between RS 400 units, separation of functions between network layers 100, 200, 300 and 401; consistent parsing of data; an "open" architecture for network 10; downward capability within the network; compatibility with standard industry protocols such as the IBM System Network Architecture; Open Systems Interconnections standard; support of network utility sessions; and standardization of common network and application return codes.

Thus DIA binds the various components of network 10 into a coherent entity by providing a common data stream for communications management purposes. DIA provides the ability to route messages between applications based in IBM System Network Architecture (SNA), (well known in the art, and more fully described in *Data and Computer Communications*. by W. Stallings, Chapter 12, McMillian Publishing, Inc. (1985)) and non-SNA reception system applications; e.g. home computer applications. Further, DIA provides common data structure between applications run at RS 400 units and applications that may be run on external computer networks; e.g. Dow Jones Services, accessed through gateway 210. As well, DIA provides support for utility sessions between backbone applications run within network 10. A more detailed description of network messaging is provided in above noted U.S. Pat. No. 5,347,632, the content of which is incorporated herein by reference.

Object Language

In accordance with the design of network 10, in order to enable the manipulation of the network objects, the application programs necessary to support the interactive text/graphic sessions are written in a high-level language referred to as "TBOL", (TRINTEX Basic Object Language, "TRINTEX" being the former company name of one of the assignees of this invention). TBOL is specifically adapted for writing the application programs so that the programs may be compiled into a compact data stream that can be interpreted by the application software operating in the user personal computer, the application software being designed to establish the network Reception System 400 previously noted and described in more detail hereafter.

The Reception System application software supports an interactive text/graphics sessions by managing objects. As explained above, objects specify the format and provide the content, i.e., the text and graphics, displayed on the user's screen so as to make up the pages that constitute the application. As also explained, pages are divided into separate areas called "partitions" by certain objects, while certain other objects describe windows which can be opened on the pages. Further, still other objects contain TBOL application programs which facilitate the data processing necessary to present the pages and their associated text and graphics.

As noted, the object architecture allows logical events to be specified in the object definitions. An example of a logical event is the completion of data entry on a screen, i.e., an application page. Logical events are mapped to physical events such as the user pressing the <ENTER> key on the keyboard. Other logical events might be the initial display of a screen page or the completion of data entry in a field. Logical events specified in page and window object definitions can be associated with the call of TBOL program objects.

RS 400 is aware of the occurrence of all physical events during the interactive text/graphic sessions. When a physical event such as depression of the forward <TAB> key corresponds to a logical event such as completion of data entry in a field, the appropriate TBOL program is executed if specified in the object definition. Accordingly, the TBOL programs can be thought of as routines which are given control to perform initialization and post-processing application logic associated with the fields, partitions and screens at the text/graphic sessions.

RS 400 run time environment uses the TBOL programs and their high-level key-word commands called verbs to provide all the system services needed to support a text/graphic session, particularly, display management, user input, local and remote data access.

TBOL programs have a structure that includes three sections: a header section in which the program name is specified; a data section in which the data structure the program will use are defined; and a code section in which the program logic is provided composed of one or more procedures. More specifically, the code section procedures are composed of procedure statements, each of which begins with a TBOL key word called a verb.

The name of a procedure can also be used as the verb in a procedure statement exactly as if it were a TBOL key-word verb. This feature enables a programmer to extend the language vocabulary to include customized application-oriented verb commands.

Continuing, TBOL programs have a program syntax that includes a series of "identifiers" which are the names and labels assigned to programs, procedures, and data structures.

An identifier may be up to 31 characters long; contain only uppercase or lowercase letters A through Z, digits 0 through 9, and/or the special character underscore (_); and must begin with a letter. Included among the system identifiers are: "header section identifiers" used in the header section for the program name; "data section identifiers" used in the data section for data structure names, field names and array names; and finally, "code section identifiers" used in the code section for identification of procedure names and statement labels. A more detailed description of TBOL is provided in parent application Ser. No. 388,156 now issued as U.S. Pat. No. 5,347,632, the contents of which patent are incorporated herein by reference.

Reception System Operation

RS 400 of computer system network 10 uses software called native code modules (described below) to enable the user to select options and functions presented on the monitor screen 414 of personal computer 405, to execute partitioned applications and to process user created events, enabling the partitioned application to interact with network 10.

Through this interaction, the user is able to input data into fields provided as part of the display, or may individually select choices causing a standard or personalized page to be built (as explained below) for display on the monitor of personal computer 405. Such inputs will cause RS 400 to interpret events and trigger pre-processors or post-processors, retrieve specified objects, communicate with system components, control user options, cause the display of advertisements on a page, open or close window partitions to provide additional navigation possibilities, and collect and report data about events, including certain types of objects processed. For example, the user may select a particular option, such as opening or closing window partition 275, which is present on the monitor and follow the selection with a completion key stroke, such as ENTER. When the completion keystroke is made, the selection is translated into a logical event that triggers the execution of a post-processor, (i.e., a partitioned application program object) to process the contents of the field.

Functions supporting the user-partitioned application interface can be performed using the command bar 290, or its equivalent using pull down windows or an overlapping cascade of windows. These functions can be implemented as part of the RS native functions or can be treated as another partition(s) defined for every page for which an appropriate set of supporting objects exist and remain resident at RS 400. If the functions are part of RS 400, they can be altered or extended by verbs defined in the RS virtual machine that permit the execution of program objects to be triggered when certain functions are called, providing maximum flexibility.

To explain the functions the use of a command bar is assumed. Command bar 290 is shown in FIGS. 3a and 3b and includes a NEXT command 291, a BACK command 292, a PATH command 293, a MENU command 294, and ACTION command 295, a JUMP command 296, a HELP command 297, and an EXIT command 298.

NEXT command 291 causes the next page in the current page set to be built. If the last page of a page set has already been reached, NEXT command 291 is disabled by RS 400, avoiding the presentation of an invalid option.

BACK command 292 causes the previous page of the current page set to be built. If the present page is the first in the page set, BACK command 292 is disabled, since it is not a valid option.

A filter program can be attached to both the NEXT or BACK functions to modify their implicit sequential nature based upon the value of the occurrence in the object set id.

PATH command 293 causes the next page to be built and displayed from a list of pages that the user has entered, starting from the first entry for every new session.

MENU command 294 causes the page presenting the previous set of choices to be rebuilt.

ACTION command 295 initiates an application dependent operation such as causing a new application partition to be interpreted, a window partition 275 to be opened and enables the user to input any information required which may result in a transaction or selection of another window or page.

JUMP command 296 causes window partition 275 to be opened, allowing the user to input a keyword or to specify one from an index that may be selected for display.

HELP command 297 causes a new application partition to be interpreted such as a HELP window pertaining to where the cursor is positioned to be displayed in order to assist the user regarding the present page, a particular partition, or a field in a page element.

EXIT command 298 causes a LOGOFF page template object (PTO) to be built, and a page logoff sequence to be presented at RS 400 monitor screen 414.

Navigation Interface

Continuing, as a further feature, network 10 includes an improved procedure for searching and retrieving applications from the store of applications distributed throughout network 10; e.g., server 205, cache/concentrator 302 and RS 400. More specifically, the procedure features use of pre-created search tables which represent subsets of the information on the network arranged with reference to the page template objects (PTO) and object-ids of the available applications so that in accordance with the procedure, the relevant tables and associated objects can be provided to and searched at the requesting RS 400 without need to search the entire store of applications on the network. As will be appreciated, this reduces the demand on the server 205 for locating and retrieving applications for display at monitor 412.

In conventional time-sharing networks that support large conventional databases, the host receives user requests for data records; locates them; and transmits, them back to the users. Accordingly, the host is obliged to undertake the data processing necessary to isolate and supply the requested information. And, as noted earlier, where large numbers of users are to be served, the many user requests can bottleneck at the host, taxing resources and leading to response slowdown.

Further, users have experienced difficulty in searching data bases maintained on conventional time-sharing networks. For example, difficulties have resulted from the complex and varied way previously known database suppliers have organized and presented their information. Particularly, some database providers require searching be done only in selected fields of the data base, thus requiring the user to be fully familiar with the record structure. Others have organized their databases on hierarchial structures which require the user understand the way the records are grouped. Still further, yet other database suppliers rely upon keyword indices to facilitate searching of their records, thus requiring the user to be knowledgeable regarding the particular keywords used by the database provider.

Network 10, however, is designed to avoid such difficulties. In the preferred embodiment, the network includes procedures for creating preliminary searches which represent subsets of the network applications users are believed likely to investigate. Particularly, in accordance with these procedures, for the active applications available on network 10, a library of tables is prepared, and maintained within each of which a plurality of so called "keywords" are provided that are correlated with page template objects and object-ids of the entry screen (typically the first screen) for the respective application. In the preferred embodiment, approximately 1,000 tables are used, each having approximately 10 to 20 keywords arranged in alphabetical order to abstract the applications on the network. Further, the object-id for each table is associated with a code in the form of a character string mnemonic which is arranged in a set of alphabetically sequenced mnemonics termed the sequence set so that on entry of a character string at an RS 400, the object-id for the relevant keyword table can be obtained from the sequence set. Once the table object-id is identified, the keyword table corresponding to the desired subset of the objects and associated applications can then be obtained from network 10. Subsequently the table can be presented to the user's RS 400, where the RS 400 can provide the data processing required to present the potentially relevant keywords, objects and associated applications to the user for further review and determination as to whether more searching is required. As will be appreciated, this procedure reduces demand on server 205 and thereby permits it to be less complex and costly, and further, reduces the likelihood of host overtaxing that may cause network response slowdown.

As a further feature of this procedure, the library of keywords and their associated PTOs and objects may be generated by a plurality of operations which appear at the user's screen as different search techniques. This permits the user to select a search technique he is most comfortable with, thus expediting his inquiry.

More particularly, the user is allowed to invoke the procedure by calling up a variety of operations. The various operations have different names and seemingly present different search strategies. Specifically, the user may invoke the procedure by initiating a "Jump" command at RS 400. Thereafter, in connection with the Jump operation, the user, when prompted, may enter a word of the user's choosing at monitor screen 414 relating to the matter he is interested in locating; i.e., a subject matter search of the network applications. Additionally, the users may invoke the procedure by alternatively calling up an operation termed "Index" with selection of the Index command. When selected, the Index command presents the user with an alphabetical listing of keywords from the tables noted above which the user can select from; i.e., an alphabetical search of the network applications. Further, the user may evoke the procedure by initiating an operation termed "Guide." By selecting the Guide command, the user is provided with a series of graphic displays that presents a physical description of the network applications; e.g., department floor plan for a store the user may be electronically shopping in. Still further, the user may invoke the procedures by initiating an operation termed "Directory." By selecting the Directory command, the user is presented with the applications available on the network as a series of hierarchial menus which present the content of the network information in commonly understood categories. Finally, the user may invoke the procedure by selecting the "Path" command, which accesses a list of keywords the user has previously selected; i.e., a personally tailored form of the Index command described above. As described hereafter, Path further includes a Viewpath operation which permits the user to visually access and manage the Path list of keywords. In preferred form, where the user has not selected a list of personalized keywords, a default set is provided which includes a predetermined list and associated applications deemed by network 10 as likely to be of interest to the user.

This ability to convert these apparently different search strategies in a single procedure for accessing pre-created library tables is accomplished by translating the procedural elements of the different search techniques into a single set of procedures that will produce a mnemonic; i.e., code word, which can first be searched at the sequence set, described above to identify the object-id for the appropriate library table and, thereafter, enable access of the appropriate table to permit selection of the desired keyword and associated PTO and object-ids. That is to say, the reception system native code simply relates the user-entered character string, alphabetical range, category, or list item of respectively, "Jump", "Index", "Directory", or "Path" to the table codes through the sequence set, so that the appropriate table can be provided to the reception system and application keyword selected. Thus, while the search techniques may appear different to the user, and in fact accommodate the user's preferences and sophistication level, they nonetheless invoke the same efficient procedure of relying upon pre-created searches which identify related application PTOs and object-ids so that the table and objects may be collected and presented at the user's RS 400 where they can be processed, thereby relieving server 205.

In preferred form, however, in order to enhance presentation speed the Guide operation is specially configured. Rather than relating the keyword mnemonic to a sequence set to identify the table object-id and range of keywords corresponding to the entry PTO and associated object-ids, the Guide operation presents a series of overlapping windows that physically describe the "store" in which shopping is being conducted or the "building" from which information is being provided. The successive windows increase in degree of detail, with the final window presenting a listing of relevant keywords. Further, the PTO and object-ids for the application entry screen are directly related to the graphic presentation of the keywords. This eliminates the need to provide variable fields in the windows for each of the keywords and enables the entry screen to be correlated directly with the window graphic. As will be appreciated, this reduces the number of objects that would otherwise be required to be staged at RS 400 to support pretention of the keyword listing at monitor screen 414, and thus speeds network response.

Figure 11:
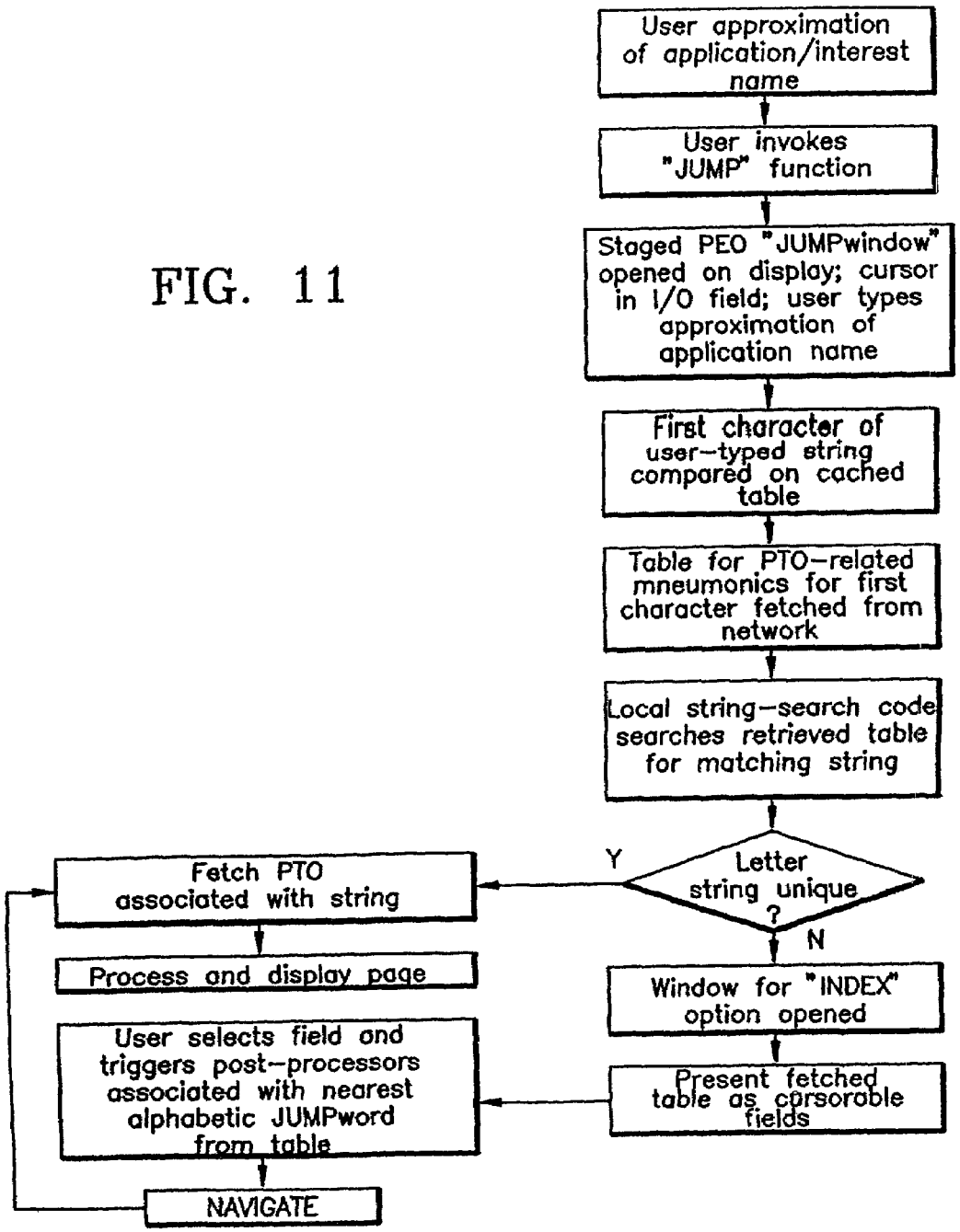
FIG. 11 is a flow diagram for an aspect of the navigation method of a reception system which might be used for supporting applications and advertising in accordance with the method of the present invention.

A more detailed understanding of the procedure may be had upon a reading of the following description and review of accompanying FIGS. 2, 3a and particularly FIG. 11 which presents a flow diagram for the Jump sequence of the search procedure.

To select a particular partitioned application from among thousands of such applications residing either at the RS 400 or within delivery system 20, network 10 avoids the need for a user to know or understand, prior to a search, the organization of such partitioned applications and the query techniques necessary to access them. This is accomplished using a collection of related commands, as described below.

The Jump command 296 as seen in FIG. 3a, can be selected, by the user from command bar 290. When Jump command 296 is selected, a window partition 275 is opened. In window 275, the user is presented and may select from a variety of displayed options that include among others, the Directory command, the Index command, and the Guide command, which when selected, have the effect noted above. Additionally, the user can select a command termed Viewpath which will present the keywords that currently make up the list of keywords associated with the user's Path command, and from which list the user can select a desired keyword. Still further, and with reference to FIG. 11, which shows the sequence where a user offers a term to identify a subject of interest, the user may enter a keyword at display field 270 within window partition 275 as a "best guess" of the character string that is assigned to a partitioned application the user desires (e.g., the user may input such English words as "news," "pet food," "games," etcetera). Where the user enters a character string it is displayed in field 270, searched by RS 400 native code (discussed below) against the sequence sets above noted to identify the object-id for the appropriate table of keywords (not shown) that RS 400 may request from host 205. While as noted above, a table may include 10 to 20 keywords, in the preferred embodiment, for the sake of speed and convenience, a typical keyword table includes approximately 12 keywords.

If the string entered by the user matches a keyword existing on one of the keyword tables, and is thus associated with a specific PTO, RS 400 fetches and displays associated objects of the partitioned applications and builds the entry page in accordance with the page composition dictated by the target PTO.

If the string entered by the user does not match a specific keyword, RS 400 presents the user with the option of displaying the table of keywords approximating the specific keyword. The approximate keywords are presented as initialized, cursorable selector fields of the type provided in connection with a Index command. The user may then move the cursor to the nearest approximation of the mnemonic he originally selected, and trigger navigation to the PTO associated with that keyword, navigation being as described hereafter in connection with the RS 400 native code.

If, after selecting the Jump command, the user selects the Index command, RS 400 will retrieve the keyword table residing at RS 400, and will again build a page with initialized, cursorable fields of keywords. The table fetched upon invoking the Index command will be comprised of alphabetic keywords that occur within the range of the keywords associated with the page template object (PTO) from which the user invoked the Index command. As discussed above, the user may select to navigate to any of this range of PTOs by selecting the relevant keyword from the display. Alternatively, the user can, thereafter, select another range of alphabetical keywords by entering an appropriate character string in a screen field provided or move forward or backward in the collection by selecting the corresponding option.

By selecting the Directory command, RS 400 can be caused to fetch of keywords, grouped by categories, to which the PTO of the current partitioned application (as specified by the object set field 630 of the current PEO) belongs. Particularly, by selecting the Directory command, RS 400, is caused to display a series of screens each of which contains alphabetically arranged general subject categories from which the user may select. Following selection of a category, a series of keywords associated with the specified category are displayed in further screens together with descriptive statements about the application associated with the keywords. Thereafter, the user can, in the manner previously discussed with regard to the Index command, select from and navigate to the PTOs of keywords which are related to the present page set by subject.

The Guide command provides a navigation method related to a hierarchical organization of applications provided on network 10, and are described by a series of sequentially presented overlaying windows of a type known in the art, each of which presents an increasing degree of detail for a particular subject area, terminating in a final window that gives keywords associated with the relevant applications. The Guide command makes use of the keyword segment which describes the location of the PTO in a hierarchy (referred to, in the preferred embodiment, as the "BFD," or Building-Floor-Department) as well as an associated keyword character string. The BFD describes the set of menus that are to be displayed on the screen as the sequence of pop-up windows. The Guide command may be invoked by requesting it from the Jump window described above, or by selecting the Menu command on Command Bar 290. As noted above, in the case of the Guide command, the PTO and object-ids for the application entry screen are directly associated with the graphic of the keyword presented in the final pop-up window. This enables direct access of the application entry screen without need to access the sequence set and keyword table, and thus, reduces response time by reducing the number of objects that must be processed at RS 400.

Activation of the Path command accesses the user's list of pre-selected keywords without their display, and permits the user to step through the list viewing the respective applications by repeatedly invoking the Path command. As will be appreciated, the user can set a priority for selecting keywords and viewing their associated applications by virtue of where on the list the user places the keywords. More specifically, if the user has several applications of particular interest; e.g., news, weather, etc., the user can place them at the top of the list, and quickly step through them with the Path command. Further, the user can view and randomly access the keywords of his list with the Viewpath operation noted above. On activation of Viewpath, the user's Path keywords are displayed and the user can cursor through them in a conventional manner to select a desired one. Further, the user can amend the list as desired by changing the keywords on the list and/or adjusting their relative position. This is readily accomplished by entering the amendments to the list presented at the screen 414 with a series of amendments to the list presented at the screen 414 with a series of amendment options presented in a conventional fashion with the list. As noted, the list may be personally selected by the user in the manner described, or created as a default by network 10.

Collectively, the Jump command; Index command, Directory command, Guide command, and Path command as described enable the user to quickly and easily ascertain the "location" of either the partitioned application presently displayed or the "location" of a desired partitioned application. "Location," as used in reference to the preferred embodiment means the specific relationships that a particular partitioned application bears to other such applications, and the method for selecting particular partitioned application from such relationships. The techniques for querying a database of objects, embodied in network 10 is an advance over the prior art, insofar as no foreknowledge of either database structure or query technique or syntax is necessary, the structure and search techniques being made manifest to the user in the course of use of the commands.

RS Application Protocol

RS protocol defines the way the RS supports user application conversation (input and output) and the way RS 400 processes partitioned application. Partitioned applications are constructed knowing that this protocol will be supported unless modified by the application. The protocol is illustrated in FIG. 6. The boxes in FIG. 6 identify processing states that the RS 400 passes through and the arrows indicate the transitions permitted between the various states and are annotated with the reason for the transition.

The various states are: (A) Initialize RS, (B) Process Objects, (C) Interpretively Execute Pre-processors, (D) wait for Event, (E) Process Event, and (F) Interpretively Execute Function Extension and/or post-processors.

The transitions between states are: (1a) Logon Page Template object Identification (PTO-id), (1b) Object Identification, Trigger Program Object identification (PO-id) & return, (3) Page Partition Template (PPT) or Window stack Processing complete, Event Occurrence, and (5) Trigger PO-id and Return.

Transition (1a) from Initialize RS (A) to Process objects (B) occurs when an initialization routine passes the object-id of the logon PTO to object interpreter 435, when the service is first invoked. Transition (1b) from Process Event (E) to Process Objects (B) occurs whenever a navigation event causes a new page template object identification (PTO-id) to be passed to object interpreter 435; or when a open window event (verb or function key) occurs passing a window object-id to the object interpreter 435; or a close window event (verb or function key) occurs causing the current top-most window to be closed.

Figure 10:
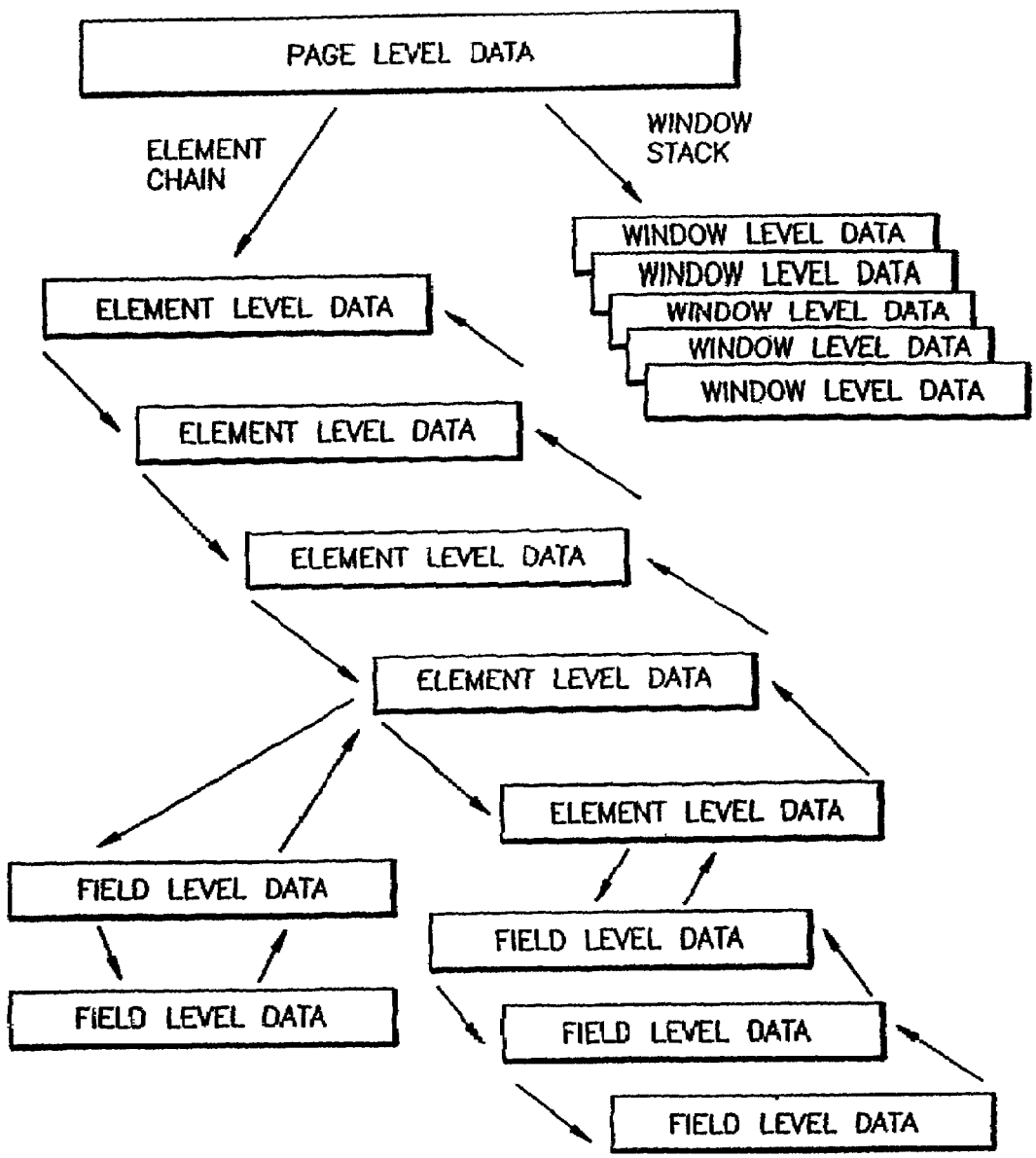
FIG. 10 illustrates generation of a page with a page processing table for a reception system which might be used for supporting applications and advertising in accordance with the method of the present invention.

While in the process object state, object interpreter 435 will request any objects that are identified by external references in call segments. Objects are processed by parsing and interpreting the object and its segments according to the specific object architecture. As object interpreter 435 processes objects, it builds a linked list structure called a page processing table (PPT), shown in FIG. 10, to reflect the structure of the page, each page partition, Page Element Objects (PEOs) required, program objects (POs) required and each window object (WO) that could be called. Object interpreter 435 requests all objects required to build a page except objects that could be called as the result of some event, such as a HELP window object.

Transition (2) from Process Objects (B) to Interpretively Execute Pre-processors (C) occurs when the object interpreter 435 determines that a pre-processor is to be triggered. Object processor 436 then passes the object-id of the program object to the TBOL interpreter 438. TBOL interpreter 438 uses the RS virtual machine to interpretively execute the program object. The PO can represent either a selector or an initializer. When execution is complete, a transition automatically occurs back to Process Objects (B).

Selectors are used to dynamically link and load other objects such as PEOs or other PDOs based upon parameters that they are passed when they are called. Such parameters are specified in call segments or selector segments. This feature enables RS 400 to conditionally deliver information to the user base upon predetermined parameters, such as his personal demographics or locale. For example, the parameters specified may be the transaction codes required to retrieve the user's age, sex, and personal interest codes from records contained in user profiles stored at the switch/file server layer 200.

Initializers are used to set up the application processing environment for a partitioned application and determine what events RS 400 may respond to and what the action will be.

Transition (3) from Process objects (B) to wait-for Event (D) occurs when object interpreter 435 is finished processing objects associated with the page currently being built or opening or closing a window on a page. In the Wait for Event state (D), an input manager, which in the preferred form shown includes keyboard manager 434 seen in FIG. 8, accepts user inputs. All keystrokes are mapped from their physical codes to logical keystrokes by the Keyboard Manager 434, representing keystrokes recognized by the RS virtual machine.

When the cursor is located in a field of a page element, keystrokes are mapped to the field and the partitioned external variable (PEV) specified in the page element object (PEO) field definition segment by the cooperative action of keyboard manager, 434 and display manager 461. Certain inputs, such as RETURN or mouse clicks in particular fields, are mapped to logical events by keyboard manager 434, which are called completion (or commit) events. Completion events signify the completion of some selection or specification process associated with the partitioned application and trigger a partition level and/or page level post-processor to process the "action" parameters associated with the user's selection and commit event.

Such parameters are associated with each possible choice or input, and are set up by the earlier interpretive execution of an initializer pre-processor instate (C). Parameters usually specify actions to perform a calculation such as the balance due on an order of several items with various prices using sales tax for the user's location, navigate to PTO-id, open window WO-id or close window. Actions parameters that involve the specification of a page or window object will result in transition (1b) to the Process Objects (B) state after the post-processor is invoked as explained below.

Function keys are used to specify one or more functions which are called when the user strikes these keys. Function keys can include the occurrence of logical events, as explained above. Additionally, certain functions may be "filtered", that is, extended or altered by SET_FUNCTION or TRIGGER_FUNCTION verbs recognized by the RS virtual machine. Function keys cause the PO specified as a parameter of the verb to be interpretively executed whenever that function is called.

Applications use this technique to modify or extend the functions provided by the RS.

Transition (5) from Process Event (E) to Interpretively Execute Pre-processors (F) occurs when Process Event state determines that a post-processor or function extension PDO is to be triggered. The id of the program object is then passed to the TBOL interpreter 438. The TBOL interpreter 438 uses the RS virtual machine to interpretively execute the PO. When execution is complete a transition automatically occurs back to Process Event (E).

Reception System Software

The reception system 400 software is the interface between the user of personal computer 405 and interactive network 10. The object of reception system software is to minimize mainframe processing, minimize transmission across the network, and support application extendibility and portability.

Figure 7:
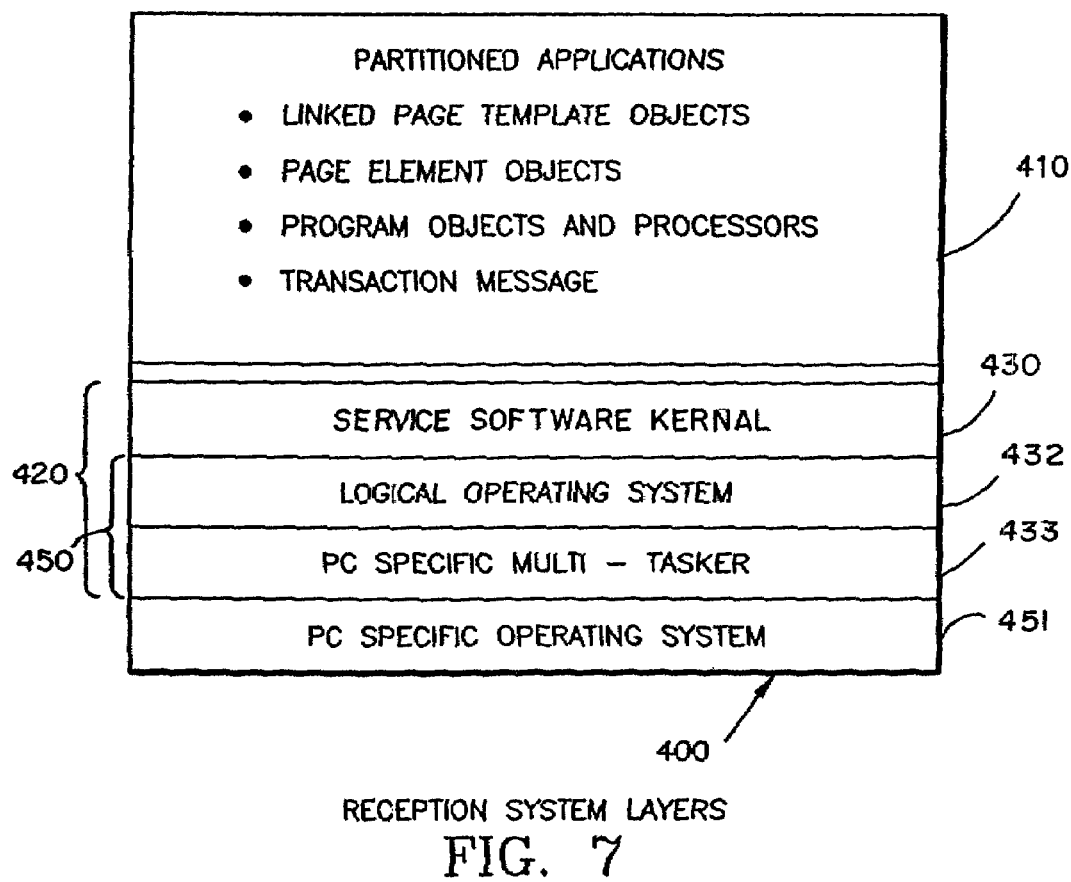
FIG. 7 is a schematic diagram that illustrates major layers for a reception system which might be used for supporting applications and advertising in accordance with the method of the present invention.

RS 400 software is composed of several layers, as shown in FIG. 7. It includes external software 451, which is composed of elements well known to the art such as device drivers, the native operating systems; i.e., MS-DOS, machine-specific assembler functions (in the preferred embodiment; e.g., CRC error checking), and "C" runtime library functions; native software 420; and partitioned applications 410.

Again with reference to FIG. 7, native software 420 is compiled from the "C" language into a target machine-specific executable, and is composed of two components:

the service software 430 and the operating environment 450. Operating environment 450 is comprised of the Logical Operating System 432, or LOS; and a multitasker 433. Service software 430 provides functions specific to providing interaction between the user and interactive network 10, while the operating environment 450 provides pseudo multitasking and access to local physical resources in support of service software 430. Both layers of native software 420 contain kernel, or device independent functions 430 and 432, and machine-specific or device dependent functions 433. All device dependencies are in code resident at RS 400, and are limited to implementing only those functions that are not common across machine types, to enable interactive network 10 to provide a single data stream to all makes of personal computer which are of the IBM or IBM compatible type. Source code for the native software 420 is included in parent application Ser. No. 388,156 now issued as U.S. Pat. No. 5,347,632, the contents of which patent are incorporated herein by reference. Those interested in a more detailed description of the reception system software may refer to the source code provided in the referenced patent.

Figure 8:
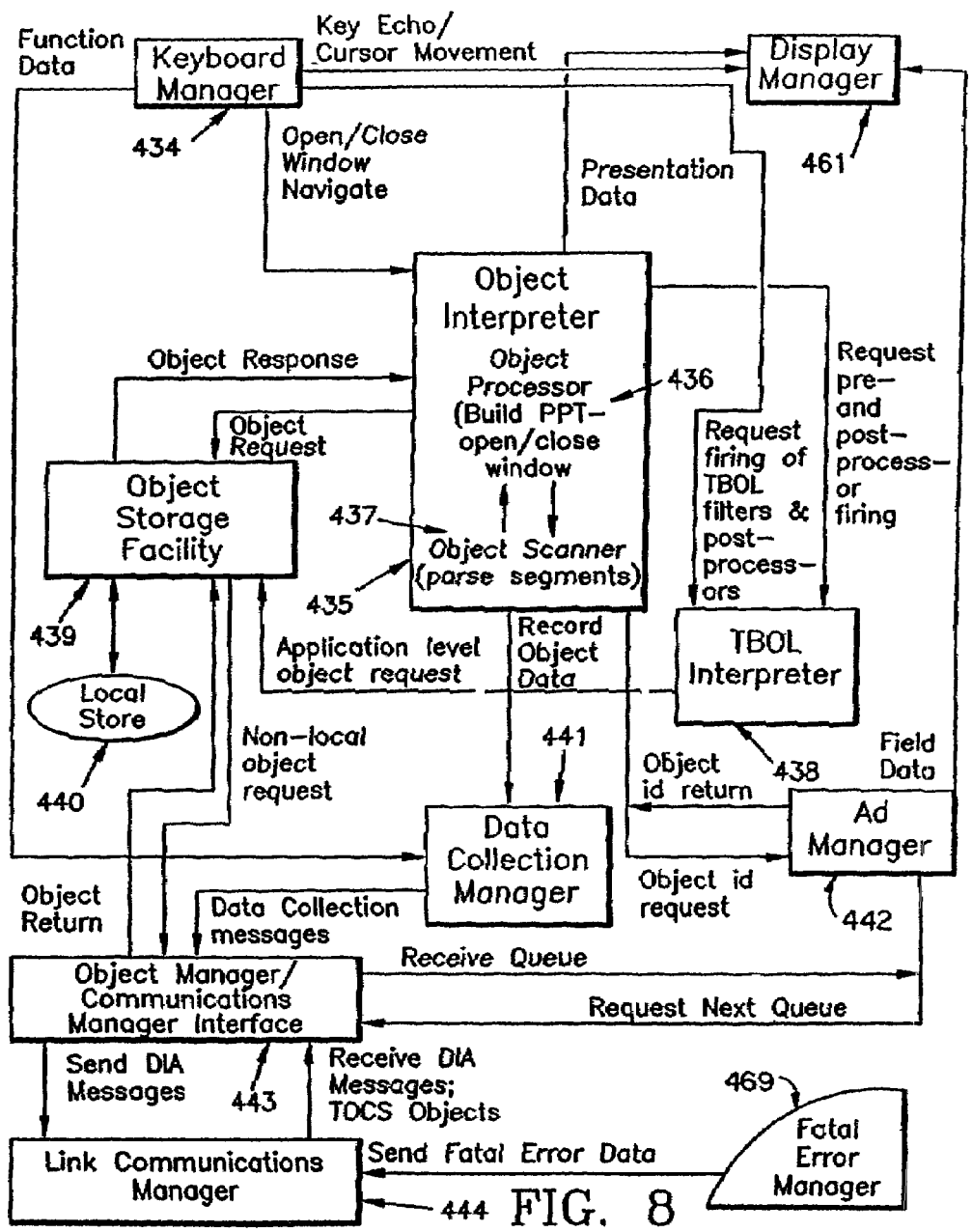
FIG. 8 is a block diagram that illustrates native code modules for a reception system which might be used for supporting applications and advertising in accordance with the method of the present invention.

Service software 430 is comprised of modules, which are device-independent software components that together obtain, interpret and store partitioned applications existing as a collection of objects. The functions performed by, and the relationship between, the service software 430 module is shown in FIG. 8 and discussed further below.

Through facilities provided by LOS 432 and multitasker 433, here called collectively operating environment 450, device-independent multitasking and access to local machine resources, such as multitasking, timers, buffer management, dynamic memory management, file storage and access, keyboard and mouse input, and printer output are provided. The operating environment 450 manages communication and synchronization of service software 430, by supporting a request/response protocol and managing the interface between the native software 420 and external software 437.

Applications software layer 410 consists of programs and data written in an interpretive language, "TRINTEX Basic Object Language" or "TBOL," described above. TBOL was written specifically for use in RS 400 and interactive network 10 to facilitate videotext-specific commands and achieve machine-independent compiling. TBOL is constructed as objects, which in interaction with one another comprise partitioned applications.

RS native software 420 provides a virtual machine interface for partitioned applications, such that all objects comprising partitioned applications "see" the same machine. RS native software provides support for the following functions: (1) keyboard and mouse input; (2) text and graphics display; (3) application interpretation; (4) application database management; (5) local application storage; (6) which network and link level communications; (7) user activity data collection; and (8) advertisement management.

With reference to FIG. 8, service software 430 is comprised of the following modules: start-up (not shown); keyboard manager 434; object interpreter 435; TBOL interpreter 438; object storage facility 439; display manager 461; data collection manager 441; ad manager 442; object/communications manager interface 443; link communications manager 444; and fatal error manager 469. Each of these modules has responsibility for managing a different aspect of RS 400.

Startup reads RS 400 customization options into RAM, including modem, device driver and telephone number options, from the file CONFIG.SM. Startup invokes all RS 400 component startup functions, including navigation to the first page, a logon screen display containing fields initialized to accept the user's id and password. Since startup is invoked only at initialization, for simplicity, it has not been shown in FIG. 8.

The principal function of keyboard manger 434 is to translate personal computer dependent physical input into a consistent set of logical keys and to invoke processors associated with these keys. Depending on the LOS key, and the associated function attached to it, navigation, opening of windows, and initiation of filter or post-processor TBOL programs may occur as the result of input events handled by the keyboard manger 434. In addition, keyboard manager 434 determines inter and intra field cursor movement, and coordinates the display of field text and cursor entered by the user with display manager 461, and sends information regarding such inputs to data collection manager 441.

Object interpreter 435 is responsible for building and recursively processing a table called the "Page Processing Table," or PPT. Object interpreter 435 also manages the opening and closing of windows at the current page. Object interpreter 435 is implemented as two sub-components: the object processor 436 and object scanner 437.

Object processor 436 provides an interface to keyboard manager 434 for navigation to new pages, and for opening and closing windows in the current page. Object processor 436 makes a request to object storage facility 439 for a page template object (PTO) or window object (WO), as requested by keyboard manager 434, and for objects and their segments which comprise the PTO or WO returned by object storage facility 439 to object processor 436. Based on the particular segments comprising the object(s) making up the new PTO or WO, object processor 436 builds or adds to the page processing table (PPT), which is an internal, linked-list, global data structure reflecting the structure of the page or page format object (PFO), each page partition or page element object (PEO), and program objects (POs) required and each window object (WO) that could be called. Objects are processed by parsing and interpreting each object and its segment(s) according to their particular structure as formalized in the data object architecture (DOA). While in the process object state, (state "B" of FIG. 6), object processor 436 will request any objects specified by the PTO that are identified by external references in call segments (e.g., field level program call 518, page element selector call 524, page format call 526, program call 532, page element call 522 segments) of such objects, and will, through a request to TBOL interpreter 438, fire initializers and selectors contained in program data segments of all PTO constituent program objects, at the page, element, and field levels. Object processor 436 requests all objects required to build a page, except objects that could only be called as the result of some event external to the current partitioned application, such as a HELP window object. When in the course of building or adding to the PPT and opening/closing WOs, object processor encounters a call to an "ADSLOT" object id, the next advertisement object id at ad manager 442 is fetched, and the identified advertisement object is retrieved either locally, if available, or otherwise from the network, so that the presentation data for the advertisement can be sent to display manager 461 along with the rest of the presentation data for the other objects to enable display to the user. Object processor 436 also passes to data collection manager 441 all object ids that were requested and object ids that were viewed. Upon completion of page or window processing, object processor 436 enters the wait for event state, and control is returned to keyboard manger 434.

The second component of object interpreter 435, object scanner 437, provides a file-like interface, shared with object storage facility 439, to objects currently in use at RS 400, to enable object processor 436 to maintain and update the PPT. Through facilities provided by object scanner 437, object processor recursively constructs a page or window in the requested or current partitioned application, respectively.

Object storage facility 439 provides an interface through which object interpreter 435 and TBOL interpreter 438 either synchronously request (using the TBOL verb operator "GET") objects without which processing in either module cannot continue, or asynchronously request (using the TBOL verb operator "FETCH") objects in anticipation of later use. Object storage facility 439 returns the requested objects to the requesting module once retrieved from either local store 440 or interactive network 10. Through control structures shared with the object scanner 437, object storage facility determines whether the requested object resides locally, and if not, makes an attempt to obtain it from interactive network 10 through interaction with link communications manager 444 via object/communications manager interface 443.

When objects are requested from object storage facility 439, only latest version of the object will be provided to guarantee currency of information to the user. Object storage facility 439 assures currency by requesting version verification from network 10 for those objects which are available locally and by requesting objects which are not locally available from delivery system 20 where currency is maintained.

Version verification increases response time. Therefore, not all objects locally available are version checked each time they are requested. Typically, objects are checked only the first time they are requested during a user session. However, there are occasions, as for example in the case of objects relating to news applications, where currency is always checked to assure integrity of the information.

The frequency with which the currency of objects is checked depends on factors such as the frequency of updating of the objects. For example, objects that are designated as ultrastable in a storage control parameter in the header of the object are never version checked unless a special version control object sent to the RS as part of logon indicates that all such objects must be version checked. Object storage facility 439 marks all object entries with such a stability category in all directories indicating that they must be version checked the next time they are requested.

Object storage facility 439 manages objects locally in local store 440, comprised of a cache (segmented between available RAM and a fixed size disk file), and stage (fixed size disk file). RAM and disk cached objects are retained only during user sessions, while objects stored in the stage file are retained between sessions. The storage control field, located in the header portion of an object, described more fully hereafter as the object "storage candidacy", indicates whether the object is stageable, cacheable or trashable.

Stageable objects must not be subject to frequent change or update. They are retained between user sessions on the system, provided storage space is available and the object has not discarded by a least-recently-used (LRU) algorithm of a conventional type; e.g., see *Operating System Theory*, by Coffman, Jr. and Denning, Prentice Hall Publishers, New York, 1973, which in accordance with the design of network 10, operates in combination with the storage candidacy value to determine the object storage priority, thus rendering the stage self-configuring as described more fully hereafter. Over time, the self-configuring stage will have the effect of retaining within local disk storage those objects which the user has accessed most often. The objects retained locally are thus optimized to each individual user's usage of the applications in the system. Response time to such objects is optimized since they need not be retrieved from the interactive computer system.

Cacheable objects can be retained during the current user session, but cannot be retained between sessions. These objects usually have a moderate update frequency. Object storage facility 439 retains objects in the cache according to the LRU storage retention algorithm. Object storage facility 439 uses the LRU algorithm to ensure that objects that are least frequently used forfeit their storage to objects that are more frequently used.

Trashable objects can be retained only while the user is in the context of the partitioned application in which the object was requested. Trashable objects usually have a very high update frequency and must not be retained to ensure that the user has access to the most current data.

More particularly and, as noted above, in order to render a public informational and transactional network of the type considered here attractive, the network must be both economical to use and fast. That is to say, the network must supply information and transactional support to the user at minimal costs and with a minimal response time. These objectives are sought to be achieved by locating as many information and transactional support objects which the user is likely to request, as close to the user as possible, i.e., primarily at the user's RS 400 and secondarily at delivery system 20. In this way, the user will be able to access objects required to support a desired application with minimal intervention of delivery system 20, thus reducing the cost of the session and speeding the response time.

However, the number of objects that can be maintained at RS 400 is restricted by at least two factors: the RS 400 storage capacity, i.e., RAM and disk sizes, and the need to maintain the stored objects current.

In order to optimize the effectiveness of the limited storage space at RS 400, the collection of objects is restricted to those likely to be requested by the user, i.e., tailored to the user's tastes—and to those least likely to be time sensitive, i.e., objects which are stable. To accomplish this, objects are coded for storage candidacy to identify when they will be permitted at RS 400, and subject to the LRU algorithm to maintain presence at RS 400.

Additionally, to assure currency of the information and transaction support provided at RS 400, objects are further coded for version identification and checking in accordance with a system of priorities that are reflected in the storage candidacy coding.

Specifically, to effect object storage management, objects are provided with a coded version id made up of the storage control byte and version control bytes identified above as elements of the object header, specifically, byte 16 and 18 shown in FIG. 4*b*. In preferred form, the version id is comprised of bytes 16 and 18 to define two fields, a first 13 bit field to identify the object version and a second three bit field to identify the object storage candidacy.

In this arrangement, the storage candidacy value of the object is addressed to not only the question of storage preference but also object currency. Specifically, the storage candidacy value establishes the basis upon which the object will be maintained at RS 400 and also identifies the susceptibility of the object to becoming stale by dictating when the object will be version checked to determine currency.

The version value of the object on the other hand, provides a parameter that can be checked against predetermined values available from delivery system 20 to determine whether an object stored at RS 400 is sufficiently current to permit its continued use, or whether the object has become stale and needs to be replaced with a current object from delivery system 20.

Still further, object storage management procedure further includes use of the LRU algorithm, for combination with the storage and version coding to enable discarding of objects which are not sufficiently used to warrant retention, thus personalizing the store of objects at RS 400 to the user's tastes. Particularly, object storage facility 439, in accordance with the LRU algorithm maintains a usage list for objects. As objects are called to support the user's applications requests, the objects are moved to the top of a usage list. As other objects are called, they push previously called objects down in the list. If an object is pushed to the bottom of the list before being recalled, it will be forfeited from the list if necessary to make room for the next called object. As will be appreciated, should a previously called object be again called before it is displaced from the list, it will be promoted to the top of the list, and once more be subject to depression in the list and possible forfeiture as other objects are called.

As pointed out above, in the course of building the screens presented to the user, objects will reside at various locations in RS 400. For example, objects may reside in the RS 400 RAM where the object is supporting a particular application screen then running or in a cache maintained at either RAM or disk 424 where the object is being held for an executing application or staged on the fixed size file on disk 424 noted above where the object is being held for use in application likely to be called by the user in the future.

In operation, the LRU algorithm is applied to all these regions and serves to move an object from RAM cache to disk cache to disk file, and potentially off RS 400 depending on object usage.

With regard to the storage candidacy value, in this arrangement, the objects stored at RS 400 include a limited set of permanent objects; e.g., those supporting logon and logoff, and other non-permanent objects which are subject to the LRU algorithm to determine whether the objects should be forfeited from RS 400 as other objects are added. Thus, in time, and based on the operation of the LRU algorithm and the storage candidacy value, the collection of objects at RS 400 will be tailored to the usage characteristics of the subscriber; i.e., self-configuring.

More particularly, the 3-bit field of the version id that contains the storage candidacy parameter can have 8 different values. A first candidacy value is applied where the object is very sensitive to time; e.g., news items, volatile pricing information such as might apply to stock quotes, etc. In accordance with this first value, the object will not be permitted to be stored on RS 400, and RS 400 will have to request such objects from delivery system 20 each time it is accessed, thus, assuring currency. A second value is applied where the object is sensitive to time but less so than the first Case; e.g., of apples in a grocery shopping application. Here, while price might change from day to day, it is unlikely to change during a session. Accordingly the object will be permitted to persist in RAM or at the disk cache during a session, but will not be permitted to be maintained at RS 400 between sessions.

Continuing down the hierarchy of time sensitivity, where the object concerns information sufficiently stable to be maintained between sessions, a third storage candidacy value is set to permit the object to be stored at RS 400 between sessions, on condition that the object will be version check the first time it is accessed in a subsequent session. As will be appreciated, during a session, and under the effect of the LRU algorithm, lack of use at RS 400 of the object may result in it being forfeited entirely to accommodate new objects called for execution at RS 400.

Still further, a fourth value of storage candidacy is applied where the object is considered sufficiently stable as not to require version checking between sessions; e.g., objects concerning page layouts not anticipated to change. In this case, the storage candidacy value may be encoded to permit the object to be retained from session to session without version checking. Here again, however, the LRU algorithm may cause the object to forfeit its storage for lack of use.

Where the object is of a type required to be stored at RS 400, as for example, objects needed to support standard screens, it is coded for storage between sessions and not subject to the LRU algorithm forfeiture. However, where such objects are likely to change in the future they may be required to be version checked the first time they are accessed in a session and thus be given a fifth storage candidacy value. If, on the other hand, the required stored object is considered likely to be stable and not require even version checking; e.g., logon screens, it will be coded with a sixth storage candidacy value for storage without version checking so as to create a substantially permanent object.

Continuing, where a RS 400 includes a large amount of combined RAM and disk capacity, it would permit more objects to be stored. However, if objects were simply coded in anticipation of the larger capacity, the objects would potentially experience difficulty, as for example, undesired forfeiture due to capacity limitations if such objects were supplied to RS 400 units having smaller RAM and disk sizes. Accordingly, to take advantage of the increased capacity of certain RS 400 units without creating difficulty in lower capacity units, objects suitable for storage in large capacity units can be so coded for retention between sessions with a seventh and eighth storage candidacy value depending upon whether the stored large capacity object requires version checking or not. Here, however, the coding will be interpreted by smaller capacity units to permit only cacheable storage to avoid undesirable forfeiture that might result from over filling the smaller capacity units.

Where an object is coded for no version checking need may nonetheless arise for a version check at some point. To permit version checking of such objects, a control object is provided at RS 400 that may be version checked on receipt of a special communication from delivery system 20. If the control object fails version check, then a one shot version checking attribute is associated with all existing objects in RS 400 that have no version checking attributes. Thereafter, the respective objects are version checked, the one shot check attribute is removed and the object is caused to either revert to its previous state if considered current or be replaced if stale.

Still further, objects required to be stored at RS 400 which are not version checked either because of lack of requirement or because of no version check without a control object, as described above, can accumulate in RS 400 as dead objects. To eliminate such accumulation, all objects having required storage are version checked over time. Particularly, the least recently used required object is version checked during a session thus promoting the object to the top of the usage list if it is still to be retained at RS 400. Accordingly, one such object will be checked per session and over time, all required objects will be version checked thereby eliminating the accumulation of dead objects.

However, in order to work efficiently, the version check attribute of the object should be ignored, so that even required objects can be version checked. Yet, in certain circumstances, e.g., during deployment of new versions of the reception system software containing new objects not yet supported on delivery system 20 which may be transferred to the fixed storage file of RS 400 when the new version is loaded, unconditional version checking may prematurely delete the object from the RS 400 as not found on delivery system 20. To avoid this problem, a sweeper control segment in the control object noted above can be used to act as a switch to turn the sweep of dead objects on and off.

With respect to version checking for currency, where an object stored at RS 400 is initially fetched or accessed during a session, a request to delivery system 20 is made for the object by specifying the version id of the object stored at RS 400.

In response, delivery system 20 will advise the reception system 400 either that the version id of the stored object matches the currency value; i.e., the stored object is acceptable, or deliver a current object that will replace the stored object shown to be stale. Alternatively, the response may be that the object was not found. If the version of the stored object is current, the stored object will be used until verified again in accordance with its storage candidacy. If the stored object is stale, the new object delivered will replace the old one and support the desired screen. If the response is object not found, the stored object will be deleted.

Therefore, based on the above description, network 10 is seen to include steps for execution at storage facility 439 which enables object reception, update and deletion by means of a combination of operation of the LRU algorithm and interpretation of the storage candidacy and version control values. In turn, these procedures cooperate to assure a competent supply of objects at RS 400 so as to reduce the need for intervention of delivery system 20, thus reducing cost of information supply and transactional support so as to speed the response to user requests.

TBOL interpreter 438 shown in FIG. 8 provides the means for executing program objects, which have been written using interpretive language, TBOL described above. TBOL interpreter 438 interprets operators and operand contained in program object 508, manages TBOL variables and data, maintains buffer and stack facilities, and provides a runtime library of TBOL verbs.

TBOL verbs provide support for data processing, program flow control, file management, object management, communications, text display, command bar control, open/close window, page navigation and sound. TBOL interpreter also interacts with other native modules through commands contained in TBOL verbs. For example: the verb "navigate" will cause TBOL interpreter 438 to request object interpreter 435 to build a PPT based on the PTO id contained in the operand of the NAVIGATE verb; "fetch" or "GET" will cause TBOL interpreter 438 to request an object from object storage facility 439; "SET_FUNCTION" will assign a filter to events occurring at the keyboard manger 434; and "FORMAT," "SEND," and "RECEIVE" will cause TBOL interpreter 438 to send application level requests to object/communications manager interface 433.

Data areas managed by TBOL interpreter 438 and available to TBOL programs are Global External Variables (GEVs), Partition External Variables (PEVs), and Runtime Data Arrays (RDAs).

GEVs contain global and system data, and are accessible to all program objects as they are executed. GEVs provide a means by which program objects may communicate with other program objects or with the RS native code, if declared in the program object. GEVs are character string variables that take the size of the variables they contain. GEVs may preferably contain a maximum of 32,000 variables and are typically used to store such information as program return code, system date and time, or user sex or age. TBOL interpreter 438 stores such information in GEVs when requested by the program which initiated a transaction to obtain these records from the RS or user's profile stored in the interactive system.

Partition external variables (PEVs) have a scope restricted to the page partition on which they are defined. PEVs are used to hold screen field data such that when PEOs and window objects are defined, the fields in the page partitions with which these objects are to be associated are each assigned to a PEV. When applications are executed, TBOL interpreter 438 transfers data between screen fields and their associated PEV. When the contents of a PEV are modified by user action or by program direction, TBOL interpreter 428 makes a request to display manager 461 to update the screen field to reflect the change. PEVs are also used to hold partition specific application data, such as tables of information needed by a program to process an expected screen input.

Because the scope of PEVs is restricted to program objects associated with the page partition in which they are defined, data that is to be shared between page partitions or is to be available to a page-level processor must be placed in GEVs or RDAs.

RDAs are internal stack and save buffers used as general program work areas. RDAs are dynamically defined at program object "runtime" and are used for communication and transfer of data between programs when the data to be passed is not amenable to the other techniques available. Both GEVs and RDAs include, in the preferred embodiment, 8 integer registers and 8 decimal registers. Preferably, there are also 9 parameter registers limited in scope to the current procedure of a program object.

All variables may be specified as operand of verbs used by the virtual machine. The integer and decimal registers may be specified as operand for traditional data processing. The parameter registers are used for passing parameters to "called" procedures. The contents of these registers are saved on an internal program stack when a procedure is called, and are restored when control returns to the "calling" procedure from the "called" procedure.

TBOL interpreter 438, keyboard manger 434, object interpreter 435, and object storage facility 439, together with device control provided by operating environment 450, have principal responsibility for the management and execution of partitioned applications at the RS 400. The remaining native code modules function in support and ancillary roles to provide RS 400 with the ability display partitioned applications to the user (display manager 461), display advertisements (ad manager 442), to collect usage data for distribution to interactive network 10 for purposes of targeting such advertisements (data collection manager 441), and prepare for sending, and send, objects and messages to interactive network 10 (object/communications manager interface 443 and link communications manager 444). Finally, the fatal error manager exists for one purpose: to inform the user of RS 400 and transmit to interactive network 10 the inability of RS 400 to recover from a system error.

Display manager 461 interfaces with a decoder using the North American Presentation Level Protocol Syntax (NAPLPS), a standard for encoding graphics data, or text code, such as ASCII, which are displayed on monitor 412 of the user's personal computer 405 as pictorial codes. Codes for other presentation media, such as audio, can be specified by using the appropriate type code in the presentation data segments. Display manager 461 supports the following functions: send NAPLPS strings to the decoder; echo text from a PEV; move the cursor within and between fields; destructive or non-destructive input field character deletion; "ghost" and "unghost" fields (a ghosted field is considered unavailable, unghosted available); turn off or on the current field cursor; open, close, save and restore bit maps for a graphics window; update all current screen fields by displaying the contents of their PEVs, reset the NAPLPS decoder to a known state; and erase an area of the screen by generating and sending NAPLPS to draw a rectangle over that area. Display manager 461 also provides a function to generate a beep through an interface with a machine-dependent sound driver.

In accordance with the method of the present invention, Ad manager 442 is invoked by object interpreter 435 to return the object id of the next available advertisement to be displayed. Ad manager 442 maintains a queue of advertising object id's targeted to the specific user currently accessing interactive network 10. Advertising objects are pre-fetched from interactive system 10 from a personalized queue of advertising ids that is constructed using data previously collected from user generated events and/or reports of objects used in the building of pages or windows, compiled by data collection manager 466 and transmitted to interactive system 10.

Advertising objects 510 are PEOs that, through user invocation of a "LOOK" command, cause navigation to partitioned applications that may themselves support, for example, ordering and purchasing of merchandise.

An advertising object id list, or "ad queue," is requested in a transaction message to delivery system 20 by ad manager 442 immediately after the initial logon response. The logon application at RS 400 places the advertising list in a specific RS global storage area called a SYS_GEV (system global external variable), which is accessible to all applications as well as to the native RS code. The Logon application also obtains the first two ad object id's from the queue and provides them to object storage facility 439 so the advertising objects can be requested. However, at logon, since no advertising objects are available at RS local storage facilities 440, ad objects, in accordance with the described storage candidacy, not being retained at the reception system between sessions, they must be requested from interactive network 10.

In a preferred embodiment, the following parametric values are established for ad manager 442: advertising object is queue capacity, replenishment threshold for advertising object id's and replenishment threshold for number of outstanding pre-fetched advertising objects. These parameters are set up in GEVs of the RS virtual machine by the logon application program object from the logon response from high function system 110. The parameters are then also accessible to the ad manager 442. Preferred values are an advertising queue capacity of 15, replenishment value of 10 empty queue positions and a pre-fetched advertising object threshold of 3.

Ad manager 442 pre-fetches advertising objects by passing advertising object id's from the advertising queue to object storage facility 439 which then retrieves the object from the interactive system if the object is not available locally. Advertising objects are pre-fetched, so they are available in RS local store 440 when requested by object interpreter 435 as it builds a page. The ad manager 442 pre-fetches additional advertising objects whenever the number of pre-fetched advertising objects not called by object interpreter 435; i.e. the number of remaining advertising objects, falls below the pre-fetch advertising threshold.

Whenever the advertising object id queue has more empty positions than replenishment threshold value, a call is made to the advertising object id queue application in high function system 110 shown in FIG. 2, via object/communications manager interface 443 for a number of advertising object id's equal to the threshold value. The response message from system 110 includes a list of advertising object id's, which ad manager 442 enqueues.

Object interpreter 435 requests the object id of the next advertising object from ad manager 442 when object interpreter 435 is building a page and encounters an object call for a partition and the specified object-id equals the code word, "ADSLOT." If this is the first request for an advertising object id that ad manager 442 has received during this user's session, ad manager '442 moves the advertising object id list from the GEV into its own storage area, which it uses as an advertising queue and sets up its queue management pointers, knowing that the first two advertising objects have been pre-fetched.

Ad manager 442 then queries object storage facility 439, irrespective of whether it was the first request of the session. The query asks if the specified advertising object id pre-fetch has been completed, i.e., is the object available locally at the RS. If the object is available locally, the object-id is passed to object interpreter 435, which requests it from object storage facility 439. If the advertising object is not available in local store 440, ad manager 442 attempts to recover by asking about the next ad that was pre-fetched. This is accomplished by swapping the top and second entry in the advertising queue and making a query to object storage facility 439 about the new top advertising object id. If that object is not yet available, the top position is swapped with the third position and a query is made about the new top position.

Besides its ability to provide advertising that have been targeted to each individual user, two very important response time problems have been solved by ad manager 442 of the present invention. The first is to eliminate from the new page response time the time it takes to retrieve an advertising object from the host system. This is accomplished by using the aforementioned pre-fetching mechanism.

The second problem is caused by pre-fetching, which results in asynchronous concurrent activities involving the retrieval of objects from interactive system 10. If an advertising object is pre-fetched at the same time as other objects required for a page are requested, the transmission of the advertising object packets could delay the transmission of the other objects required to complete the current page by the amount of time required to transmit the advertising object(s). This problem is solved by the structuring the requests from object interpreter 435 to the ad manager 442 in the following way:

1. Return next object id of pre-fetched advertising object & pre-fetch another;
2. Return next advertising object id only; and
3. Pre-fetch next advertising object only.

By separating the function request (1) into its two components, (2) and (3), object interpreter 435 is now able to determine when to request advertising object id's and from its knowledge of the page build process, is able to best determine when another advertising object can be pre-fetched, thus causing the least impact on the page response time. For example, by examining the PPT, object interpreter 435 may determine whether any object requests are outstanding. If there are outstanding requests, advertising request type 2 would be used. When all requested objects are retrieved, object interpreter 435 then issues an advertising request type 3. Alternatively, if there are no outstanding requests, object interpreter 435 issues an advertising request type 1. This typically corresponds to the user's "think time" while examining the information presented and when RS 400 is in the Wait for Event state (D).

Data collection manager '441 is invoked by object interpreter 435 and keyboard manger 434 to keep records about what objects a user has obtained (and, if a presentation data segment 530 is present, seen) and what actions users have taken (e.g. "NEXT," "BACK," "LOOK," etc.)

The data collection events that are to be reported during the user's session are sensitized during the logon process. The logon response message carries a data collection indicator with bit flags set to "on" for the events to be reported. These bit flags are enabled (on) or disabled (off) for each user based on information contained in the user's profile stored and sent from high function host 110. A user's data collection indicator is valid for the duration of his session. The type of events to be reported can be changed at will in the host data collection application. However, such changes will affect only users who logon after the change.

Data collection manager 441 gathers information concerning a user's individual system usage characteristics. The types of informational services accessed, transactions processed, time information between various events, and the like are collected by data collection manager 441, which compiles the information into message packets (not shown). The message packets are sent to network 10 via object/communication manager interface 443 and link communications manager 444. Message packets are then stored by high function host 110 and sent to an offline processing facility for processing. The characteristics of users are ultimately used as a means to select or target various display objects, such as advertising objects, to be sent to particular users based on consumer marketing strategies, or the like, and for system optimization.

Object/communications manager interface 443 is responsible for sending and receiving DIA (Data Interchange Architecture described above) formatted messages to or from interactive network 10. Object/communications manager 443 also handles the receipt of objects, builds a DIA header for messages being sent and removes the header from received DIA messages or objects, correlates requests and responses, and guarantees proper block sequencing. Object/communications manager interface 443 interacts with other native code modules as follows: object/communications manager 443 (1) receives all RS 400 object requests from object storage facility 439, and forwards objects received from network 10 via link communications manager 444 directly to the requesting modules; (2) receives ad list requests from ad manager 442, which thereafter periodically calls object/communications manager 443 to receive ad list responses; (3) receives data collection messages and sends requests from data collection manager 441; (4) receives application-level requests from TBOL interpreter 438, which also periodically calls object/communications manager interface 443 to receive responses (if required); and (5) receives and sends DIA formatted objects and messages from and to link communications manager 444.

Object/communications manager interface 443 sends and receives DIA formatted messages on behalf of TBOL interpreter 438 and sends object requests and receives objects on behalf of object storage facility 439. Communication packets received containing parts of requested objects are passed to object storage facility 439 which assembles the packets into the object before storing it. If the object was requested by object interpreter 435, all packets received by object storage facility 439 are also passed to object interpreter 435 avoiding the delay required to receive an entire object before processing the object. Objects which are pre-fetched are stored by object storage facility 439.

Messages sent to interactive network 10 are directed via DIA to applications in network 10. Messages may include transaction requests for records or additional processing of records or may include records from a partitioned application program object or data collection manager 441. Messages to be received from network 10 usually comprise records requested in a previous message sent to network 10. Requests received from object storage facility 439 include requests for objects from storage in interactive system 10. Responses to object requests contain either the requested object or an error code indicating an error condition.

Object/communications manager 443 is normally the exclusive native code module to interface with link communications manager 444 (except in the rare instance of a fatal error). Link communications manager 444 controls the connecting and disconnecting of the telephone line, telephone dialing, and communications link data protocol. Link communications manager 444 accesses network 10 by means of a communications medium (not shown) link communications manager 444, which is responsible for a dial-up link on the public switched telephone network (PSTN). Alternatively, other communications means, such as cable television or broadcast media, may be used. Link communications manager 444 interfaces with TBOL interpreter for connect and disconnect, and with interactive network 10 for send and receive.

Link communications manager 444 is subdivided into modem control and protocol handler units. Modem control (a software function well known to the art) hands the modem specific handshaking that occurs during connect and disconnect. Protocol handler is responsible for transmission and receipt of data packets using the TCS (TRINTEX Communications Subsystem) protocol (which is a variety of OSI link level protocol, also well known to the art).

Fatal error manager 469 is invoked by all reception system components upon the occurrence of any condition which precludes recovery. Fatal error manager 469 displays a screen to the user with a textual message and an error code through display manager 461. Fatal error manager 469 sends an error report message through the link communications manager 444 to a subsystem of interactive network 10.

The source code for the reception system software as noted above is described in parent application Ser. No. 388,156 filed Jul. 28, 1989, now issued as U.S. Pat. No. 5,347,632, the contents of which are incorporated herein by reference.

Sample Application

Page 255 illustrated in FIG. 3*b* corresponds to a partitioned application that permits a user to purchase apples. It shows how the monitor screen 414 of the reception system 400 might appear to the user. Displayed page 255 includes a number of page partitions and corresponding page elements.

Figure 9:
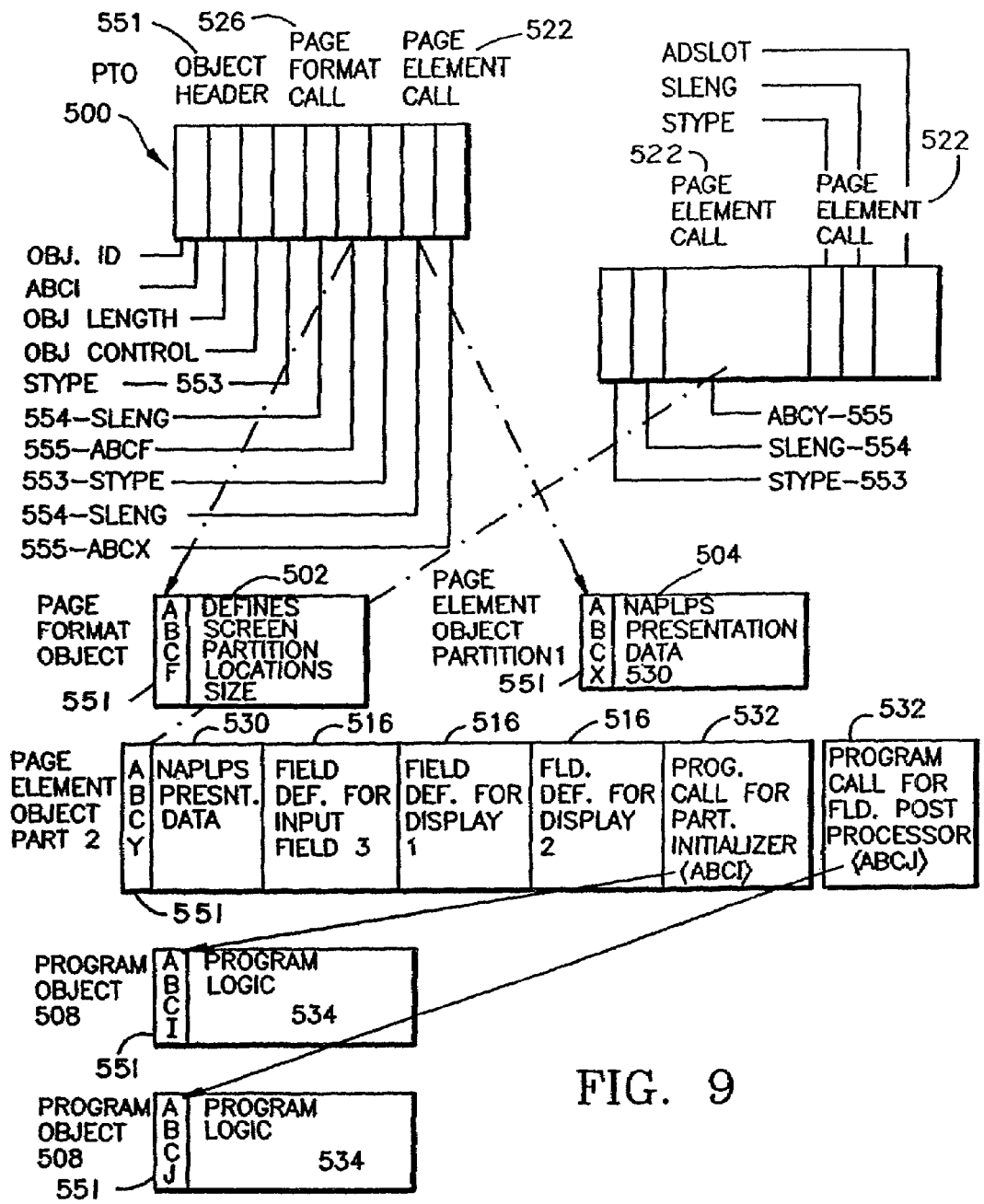
FIG. 9 is a schematic diagram that illustrates an example of a partitioned application to be processed by a reception system which might be used for supporting applications and advertising in accordance with the method of the present invention.

The page template object (PTO) 500 representing page 255 is illustrated in FIG. 9. PTO 500 defines the composition of the page, including header 250, body 260, display fields 270, 271, 272, advertising 280, and command bar 290. Page element objects (PEOs) 504 are associated with page partitions numbered; e.g., 250, 260, 280. They respectively, present information in the header 250, identifying the page topic as ABC APPLES; in the body 260, identifying the cost of apples; and prompt the user to input into fields within body 260 the desired number of apples to be ordered. In advertising 280, presentation data and a field representing a post-processor that will cause the user to navigate to a targetable advertising, is presented.

In FIG. 9, the structure of PTO 500 can be traced. PTO 500 contains a page format call segment 526, which calls page format object (PFO) 502. PFO 502 describes the location and size of partitions on the page and numbers assigned to each partition. The partition number is used in page element call segments 522 so that an association is established between a called page element object (PEO) 504 and the page partition where it is to be displayed. Programs attached to this PEO can be executed only when the cursor is in the page partition designated within the PEO.

PTO 500 contains two page element call segments 522, which reference the PEOs 504 for partitions 250 and 260. Each PEO 504 defines the contents of the partition. The header in partition 250 has only a presentation data segment 530 in its PEO 504. No input, action, or display fields are associated with that partition.

The PEO 504 for partition 260 contains a presentation data segment 530 and field definition segments 516 for the three fields that are defined in that partition. Two of the fields will be used for display only. One field will be used for input of user supplied data.

In the example application, the PEO 504 for body partition 260 specifies that two program objects 508 are part of the body partition. The first program; shown in Display field 270,271,272, is called an initializer and is invoked unconditionally by TBOL interpreter 438 concurrently with the display of presentation data for the partition. In this application, the function of the initializer is represented by the following pseudo-code:

1. Move default values to input and display fields;
 2. "SEND" a transaction to the apple application that is resident on interactive system 10;
 3. "RECEIVE" the result from interactive system 10; i.e., the current price of an apple;
 4. Move the price of an apple to PEV 271, so that it will be displayed;
 5. Position the cursor on the input field; and
 6. Terminate execution of this logic.

The second program object 508 is a field post-processor. It will be invoked conditionally, depending upon the user keystroke input. In this example, it will be invoked if the user changes the input field contents by entering a number. The pseudo code for this postprocessor is as follows:

1. Use the value in PEV 270 (the value associated with the data entered by the user into the second input data field 270) to be the number of apples ordered.
 2. Multiply the number of apples ordered times the cost per apple previously obtained by the initializer;
 3. Construct a string that contains the message "THE COST OF THE APPLES YOU ORDERED IS $45.34";
 4. Move the string into PEV 272 so that the result will be displayed for the user; and
 5. Terminate execution of this logic.

The process by which the "APPLES" application is displayed, initialized, and run is as follows.

The "APPLES" application is initiated when the user navigates from the previous partitioned application, with the navigation target being the object id of the "APPLES" PTO 500 (that is, object id ABC1). This event causes keyboard manager 434 to pass the PTO object id, ABC1 (which may, for example, have been called by the keyword navigation segment 520 within a PEO 504 of the previous partitioned application), to object interpreter 435. With reference to the RS application protocol depicted in FIG. 6, when the partitioned application is initiated, RS 400 enters the Process Object state (B) using transition (1). Object interpreter 435 then sends a synchronous request for the PTO 500 specified in the navigation event to object storage facility 439. Object storage facility 439 attempts to acquire the requested object from local store 440 or from delivery system 20 by means of object/communication manager 443, and returns an error code if the object cannot be acquired.

Figure 4D:
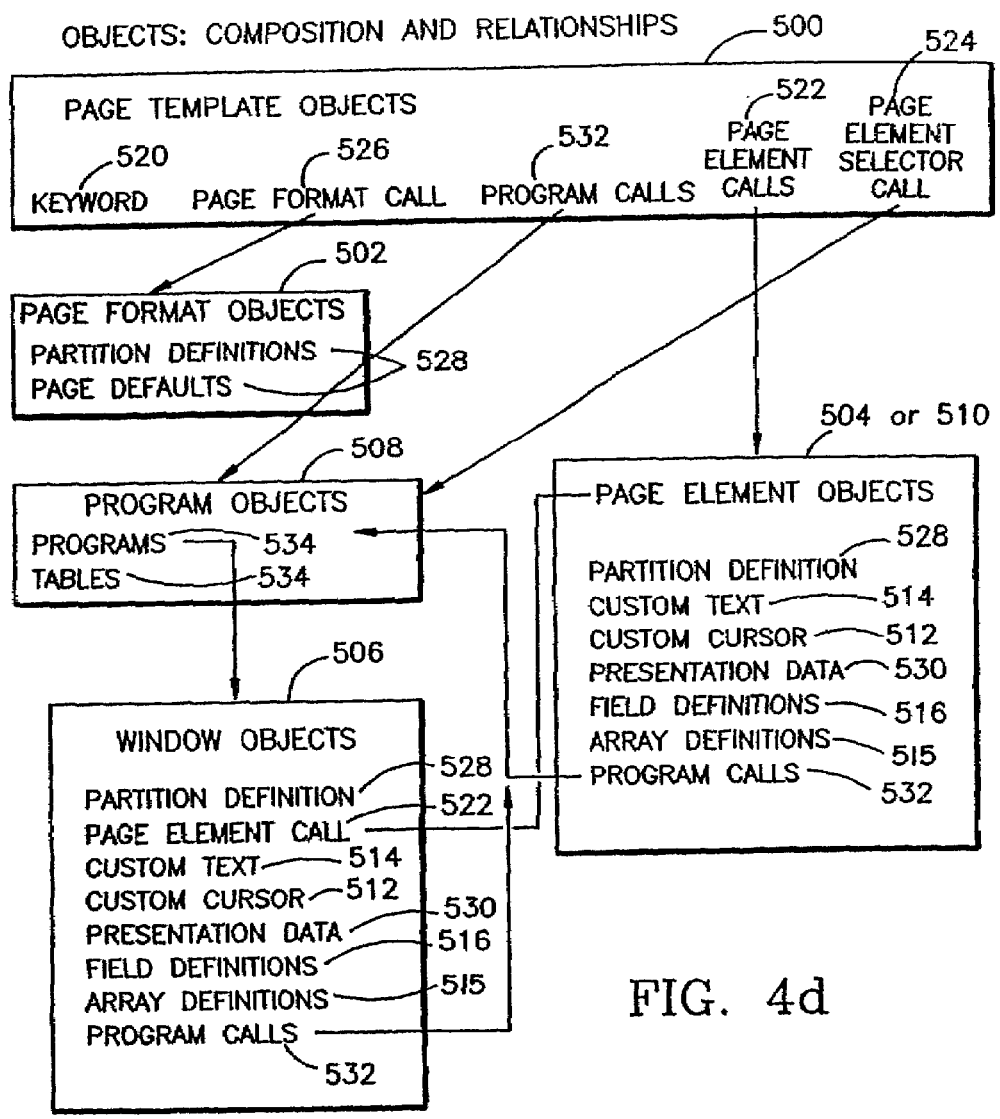
Figure 5A:
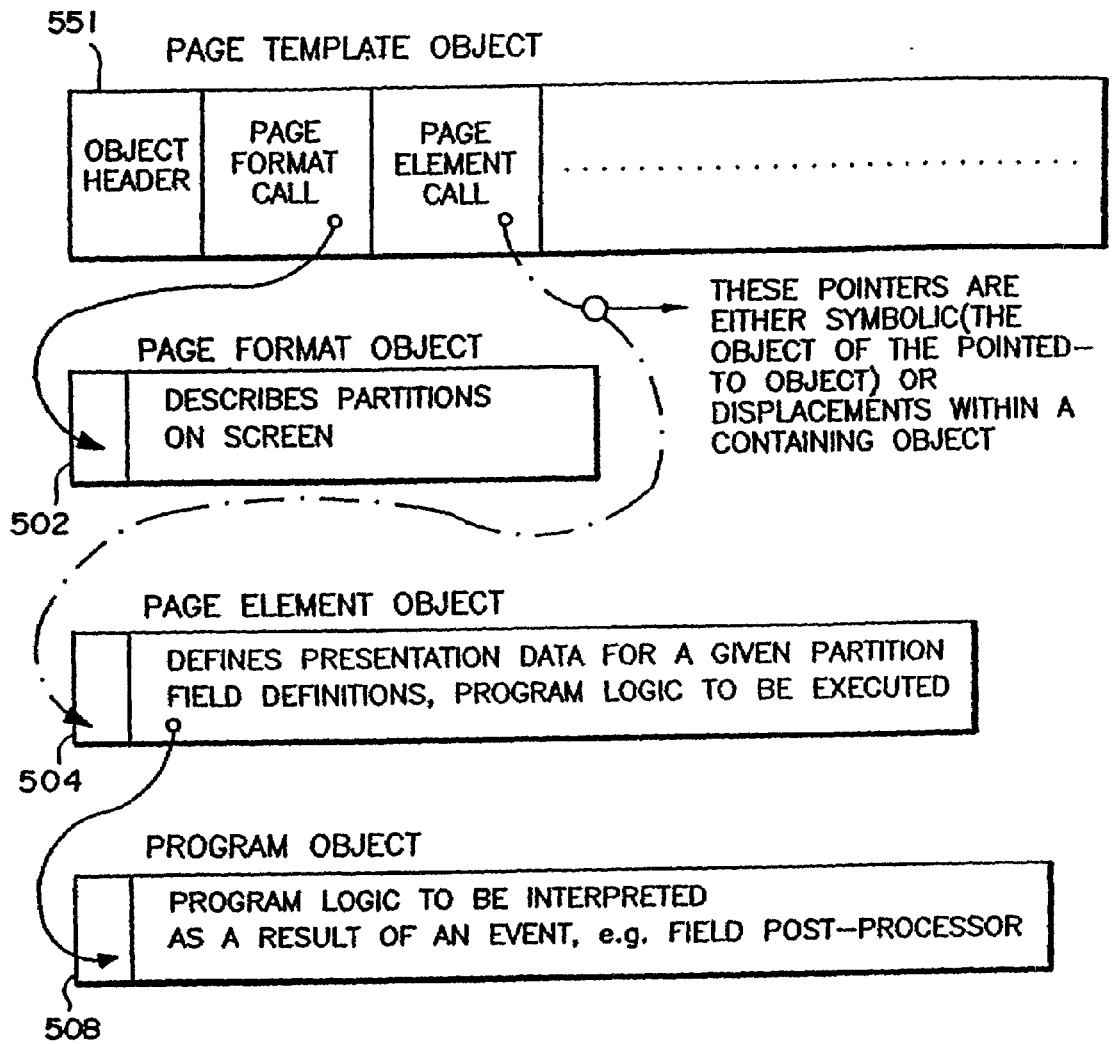
FIG. 5a is a schematic diagram that illustrates the configuration of the page template object which might be used for presentation of an application and advertising in accordance with the method of the present invention.
Figure 5B:
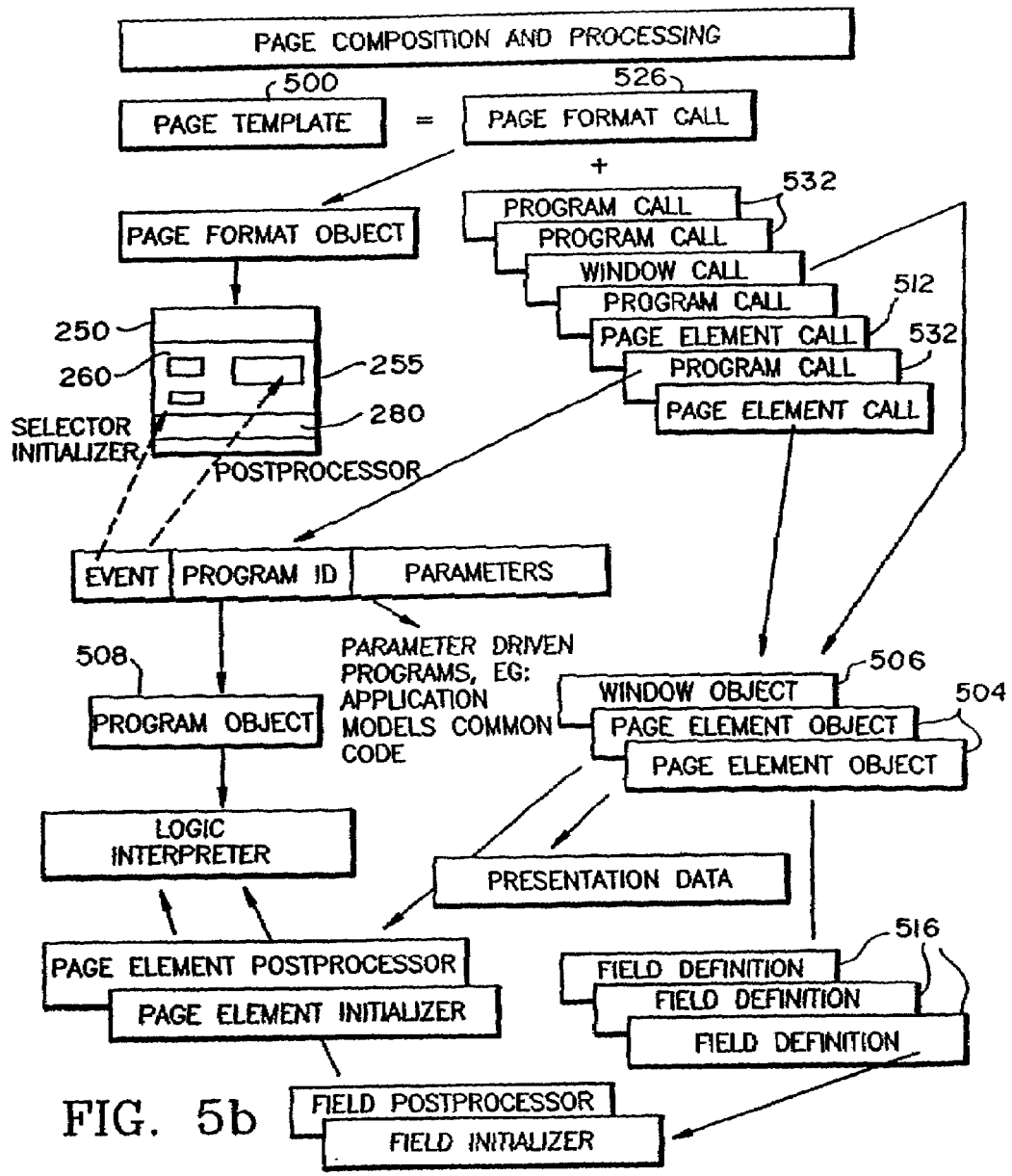
FIG. 5b is a schematic diagram that illustrates page composition which might be used for presentation of an application and advertising in accordance with the method of the present invention.

Once the PTO 500 is acquired by object/communications manager 443, object interpreter 435 begins to build PPT by parsing PTO 500 into its constituent segment calls to pages and page elements, as shown in FIG. 4*d* and interpreting such segments. PFO and PEO call segments 526 and 522 require the acquisition of the corresponding objects with object id's <ABCF>, <ABCX> and <ABCY>. Parsing and interpretation of object ABCY requires the further acquisition of program objects <ABCI> and <ABCJ>.

During the interpretation of the PEOs 504 for partitions 250 and 260 other RS 400 events are triggered. This corresponds to transition (2) to interpret pre-processors state (C) in FIG. 6. Presentation data 530 is sent to display manager 461 for display using a NAPLPS decoder within display manager 461, and, as the PEO <ABCY> for partition 260 is parsed and interpreted by object interpreter 435, parameters in program call segment 532 identify the program object <ABCI> as an initializer. Object interpreter 435 obtains the program object from object storage facility 439, and makes a request to TBOL interpreter 438 to execute the initializer program object 508 <ABCI>. The initializer performs the operations specified above using facilities of the RS virtual machine. TBOL interpreter 438, using operating environment 450, executes initializer program object 506 <ABCI>, and may, if a further program object 508 is required in the execution of the initializer, make a synchronous application level object request to object storage facility 439. When the initializer terminates, control is returned to object interpreter 435, shown as the return path in transition (2) in FIG. 6.

Having returned to the process object state (B), object processor 435 continues processing the objects associated with PTO <ABCI>. Object interpreter continues to construct the PPT, providing RS 400 with an environment for subsequent processing of the PTO <ABCI> by pre-processors and post-processors at the page, partition, and field levels. When the PPT has been constructed and the initializer executed, control is returned to keyboard manager 434, and the RS enters the wait for event (E) state, via transition (4), as shown in FIG. 6.

In the wait for event state, the partitioned application waits for the user to create an event. In any partitioned application, the user has many options. For example, the user may move the cursor to the "JUMP" field 296 on the command bar 290, which is outside the current application, and thus cause subsequent navigation to another application. For purposes of this example, it is assumed that the user enters the number of apples he wishes to order by entering a digit in display field 271.

Keyboard manager 434 translates the input from the user's keyboard to a logical representation independent of any type of personal computer. Keyboard manager 434 saves the data entered by the user in a buffer associated with the current field defined by the location of the cursor. The buffer is indexed by its PEV number, which is the same as the field number assigned to it during the formation of the page element. Keyboard manager 434 determines for each keystroke whether the keystroke corresponds to an input event or to an action or completion event. Input events are logical keystrokes and are sent by keyboard manager to display manager 461, which displays the data at the input field location. Display manager 461 also has access to the field buffer as indexed by its PEV number.

The input data are available to TBOL interpreter 438 for subsequent processing. When the cursor is in a partition, only the PEVs for that partition are accessible to the RS virtual machine. After the input from the user is complete (as indicated by a user action such as pressing the RETURN key or entry of data into a field with an action attribute), RS 400 enters the Process Event state (E) via transition (4).

For purposes of this example, let us assume that the user enters the digit "5" in input field 270. A transition is made to the process event state (E). Keyboard manager 434 and display manager 437 perform a number of actions, such as the display of the keystroke on the screen, the collection of the keystroke for input, and optionally, the validation of the keystroke, i.e., numeric input only in numeric fields. When the keystroke is processed, a return is made to the wait for the event state (D). Edit attributes are specified in the field definition segment.

Suppose the user inputs a "6" next. A transition occurs to the PE state and after the "6" is processed, the wait for Event (D) state is reentered. If the user hits the "completion" key (e.g., ENTER) the Process Event (E) state will be entered. The action attributes associated with field 272 identify this as a system event to trigger post-processor program object <ABCJ>. When the interpretive execution of program object <ABCJ> is complete, the wait for event state (D) will again be entered. The user is then free to enter another value in the input field, or select a command bar function and exit the apples application.

While this invention has been described in its preferred form, it will be appreciated that changes may be made in the form, construction, procedure and arrangement of its various steps without departing from its spirit or scope.

What we claim is:

1. A method for supplying additional information in a computer network including a multiplicity of user reception systems at which respective users can request applications that include interactive services so that the additional information may be presented in a display along with a user requested application, the method comprising:
   a. compiling data concerning the respective users;
   b. establishing characteristics for respective users based on the compiled data; and
   c. structuring the additional information, separate from applications so that the additional information may be selectively supplied to and retrieved at the reception systems for presentation to the respective users in accordance with the characteristics established for the respective reception system users and concurrently with a requested application wherein supplying additional information to the reception system includes storing a non-zero predetermined amount of the additional information in a store established at the respective reception systems.

2. The method of claim 1 wherein supplying additional information to the reception system includes pre-fetching the additional information from the network when utilization of the store of the additional information falls below a predetermined level.

3. The method of claim 2 wherein pre-fetching the additional information is dependent on the size of the store.

4. The method of claim 3 wherein storing the additional information at the reception system includes maintaining a list identifying the additional information to be presented.

5. The method of claim 1 wherein the supplying of the additional information to the reception system for presentation includes a request by the reception system for the additional information from the network when the additional information sought to be presented is unavailable at the reception system.

* * * * *